US012645948B2

(12) United States Patent
Yang et al.

(10) Patent No.: US 12,645,948 B2
(45) Date of Patent: Jun. 2, 2026

(54) MACHINE LEARNING-BASED GENERATION OF TESTING PLANS FOR TESTING OF INFORMATION TECHNOLOGY ASSETS

(71) Applicant: Dell Products L.P., Round Rock, TX (US)

(72) Inventors: Jianfei Yang, Chengdu (CN); Ruiyang Zhang, Chengdu (CN); Mingyi Luo, Chengdu (CN); Weilan Pu, Chengdu (CN); Lifeng Zheng, Chengdu (CN); Xiaofeng Ge, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 1056 days.

(21) Appl. No.: 17/735,224

(22) Filed: May 3, 2022

(65) Prior Publication Data

US 2023/0334336 A1     Oct. 19, 2023

(30) Foreign Application Priority Data

Apr. 14, 2022     (CN) .......................... 202210401015.3

(51) Int. Cl.
*G06N 3/126* (2023.01)
*G06F 11/26* (2006.01)

(52) U.S. Cl.
CPC ............. *G06N 3/126* (2013.01); *G06F 11/26* (2013.01)

(58) Field of Classification Search
None
See application file for complete search history.

(56) References Cited

U.S. PATENT DOCUMENTS 5,930,497 A *   7/1999   Cherian .............. G06F 11/3428
                                                            703/2
11,422,926 B2 *   8/2022   Callahan ............. G06F 11/3688
(Continued)

FOREIGN PATENT DOCUMENTS

CN        106528433 A *   3/2017   .......... G06F 11/3676

OTHER PUBLICATIONS

NPL_A Test Case Priority Level Sequencing Method for White Box Testing_CN-106528433_Engilish Translation (Year: 2016).*
(Continued)

*Primary Examiner* — Ziaul A Chowdhury
(74) *Attorney, Agent, or Firm* — Ryan, Mason & Lewis, LLP

(57)     ABSTRACT

An apparatus comprises a processing device configured to determine one or more testing goals for testing to be performed on one or more of a plurality of information technology assets of an information technology infrastructure and to select two or more of a plurality of testing plans based at least in part on scores assigned to respective ones of the plurality of testing plans, the assigned scores characterizing whether respective ones of the plurality of testing plans meet the determined one or more testing goals. The processing device is further configured to generate, utilizing one or more machine learning-based genetic algorithms that take as input the selected two or more testing plans, one or more additional testing plans, and to execute the one or more additional testing plans on the one or more of the plurality of information technology assets of the information technology infrastructure.

20 Claims, 19 Drawing Sheets

(56) References Cited

U.S. PATENT DOCUMENTS

2010/0274520 A1 *  10/2010  Ur ....................... G06F 11/3676
                                                 702/123
2021/0064515 A1 *   3/2021  Xu ....................... G06N 3/0499
2021/0263842 A1 *   8/2021  Sekhar .................. G06N 20/00

OTHER PUBLICATIONS

X. Neufeld et al. "A Hybrid Approach to Planning and Execution In Dynamic Environments Through Hierarchical Task Networks and Behavior Trees," Proceedings of the Fourteenth Artificial Intelligence and Interactive Digital Entertainment Conference, Nov. 13-17, 2018, pp. 201-207.
O. Biggar et al., "A Principled Analysis of Behavior Trees and Their Generalisations," arXiv:2008.11906v2, May 25, 2021, 13 pages.
S. L. Kosakovsky Pond et al., "GARD: A Genetic Algorithm for Recombination Detection," Bioinformatics, vol. 22, No. 24, Dec. 2006, pp. 3096-3098.
M. Iovino et al., "A Survey of Behavior Trees in Robotics and AI," arXiv:2005.05842v2, May 13, 2020, 22 pages.
A. E. Eiben et al., "Genetic Algorithms with Multi-Parent Recombination," Proceedings of the 3rd Conference on Parallel Problem Solving from Nature, vol. 866, Oct. 1994, 10 pages.
M. Mitchell, "Genetic Algorithms: An Overview," Complexity, vol. 1, No. 1, Sep./Oct. 1995, 17 pages.
A. J. Umbarkar et al., "Crossover Operators in Genetic Algorithms: A Review," ICTACT Journal on Soft Computing, vol. 6, No. 1, Oct. 2015, pp. 1083-1092.

* cited by examiner

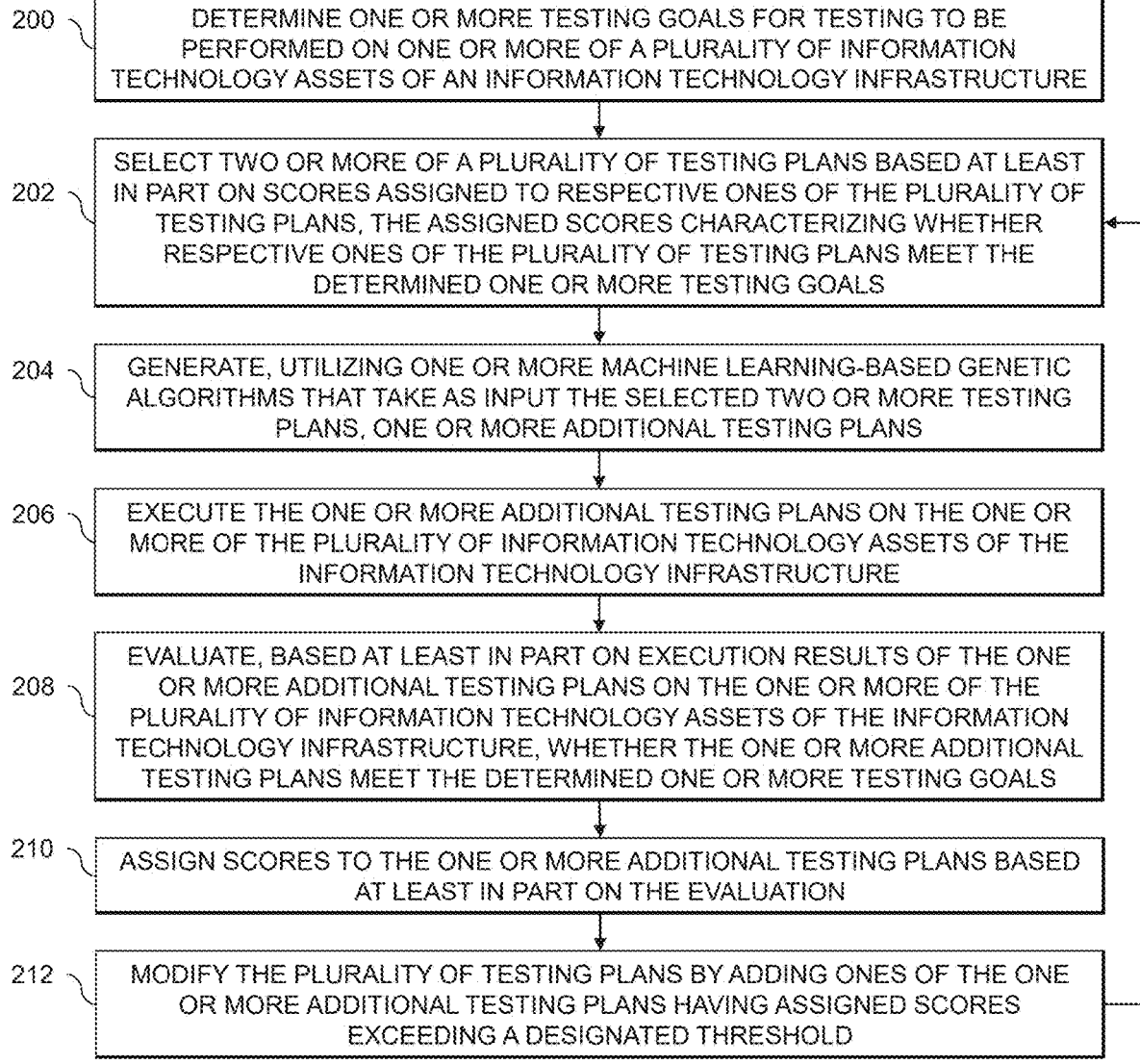

200    DETERMINE ONE OR MORE TESTING GOALS FOR TESTING TO BE PERFORMED ON ONE OR MORE OF A PLURALITY OF INFORMATION TECHNOLOGY ASSETS OF AN INFORMATION TECHNOLOGY INFRASTRUCTURE

202    SELECT TWO OR MORE OF A PLURALITY OF TESTING PLANS BASED AT LEAST IN PART ON SCORES ASSIGNED TO RESPECTIVE ONES OF THE PLURALITY OF TESTING PLANS, THE ASSIGNED SCORES CHARACTERIZING WHETHER RESPECTIVE ONES OF THE PLURALITY OF TESTING PLANS MEET THE DETERMINED ONE OR MORE TESTING GOALS

204    GENERATE, UTILIZING ONE OR MORE MACHINE LEARNING-BASED GENETIC ALGORITHMS THAT TAKE AS INPUT THE SELECTED TWO OR MORE TESTING PLANS, ONE OR MORE ADDITIONAL TESTING PLANS

206    EXECUTE THE ONE OR MORE ADDITIONAL TESTING PLANS ON THE ONE OR MORE OF THE PLURALITY OF INFORMATION TECHNOLOGY ASSETS OF THE INFORMATION TECHNOLOGY INFRASTRUCTURE

208    EVALUATE, BASED AT LEAST IN PART ON EXECUTION RESULTS OF THE ONE OR MORE ADDITIONAL TESTING PLANS ON THE ONE OR MORE OF THE PLURALITY OF INFORMATION TECHNOLOGY ASSETS OF THE INFORMATION TECHNOLOGY INFRASTRUCTURE, WHETHER THE ONE OR MORE ADDITIONAL TESTING PLANS MEET THE DETERMINED ONE OR MORE TESTING GOALS

210    ASSIGN SCORES TO THE ONE OR MORE ADDITIONAL TESTING PLANS BASED AT LEAST IN PART ON THE EVALUATION

212    MODIFY THE PLURALITY OF TESTING PLANS BY ADDING ONES OF THE ONE OR MORE ADDITIONAL TESTING PLANS HAVING ASSIGNED SCORES EXCEEDING A DESIGNATED THRESHOLD

Figure 3B:
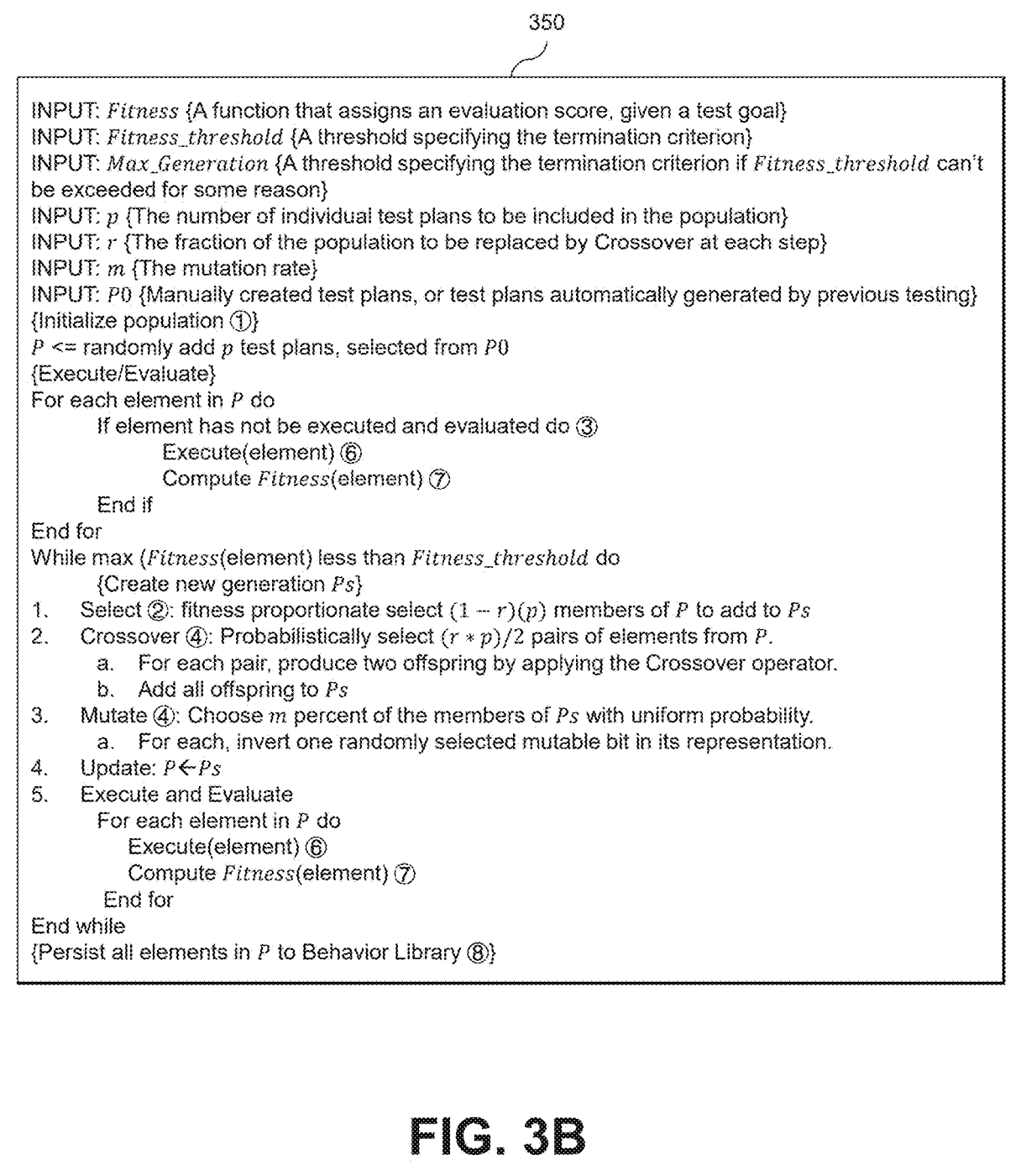

INPUT: *Fitness* {A function that assigns an evaluation score, given a test goal}
INPUT: *Fitness_threshold* {A threshold specifying the termination criterion}
INPUT: *Max_Generation* {A threshold specifying the termination criterion if *Fitness_threshold* can't be exceeded for some reason}
INPUT: $p$ {The number of individual test plans to be included in the population}
INPUT: $r$ {The fraction of the population to be replaced by Crossover at each step}
INPUT: $m$ {The mutation rate}
INPUT: *P0* {Manually created test plans, or test plans automatically generated by previous testing}
{Initialize population ①}
$P <=$ randomly add $p$ test plans, selected from *P0*
{Execute/Evaluate}
For each element in $P$ do
        If element has not be executed and evaluated do ③
                Execute(element) ⑥
                Compute *Fitness*(element) ⑦
        End if
End for
While max (*Fitness*(element) less than *Fitness_threshold* do
        {Create new generation *Ps*}
1.    Select ②: fitness proportionate select $(1 - r)(p)$ members of $P$ to add to *Ps*
2.    Crossover ④: Probabilistically select $(r * p)/2$ pairs of elements from $P$.
        a.   For each pair, produce two offspring by applying the Crossover operator.
        b.   Add all offspring to *Ps*
3.    Mutate ④: Choose $m$ percent of the members of *Ps* with uniform probability.
        a.   For each, invert one randomly selected mutable bit in its representation.
4.    Update: $P \leftarrow Ps$
5.    Execute and Evaluate
        For each element in $P$ do
            Execute(element) ⑥
            Compute *Fitness*(element) ⑦
        End for
End while
{Persist all elements in $P$ to Behavior Library ⑧}

700
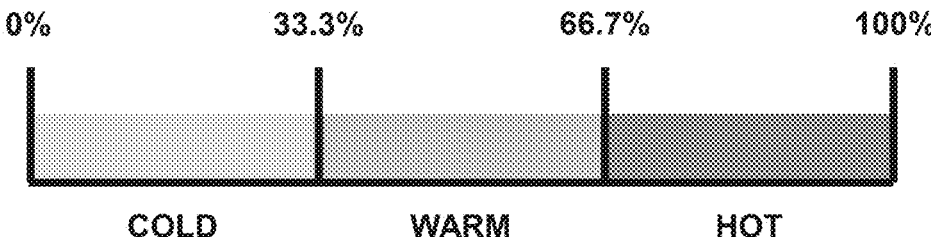
COLD         WARM         HOT
FIG. 7

FIG. 8

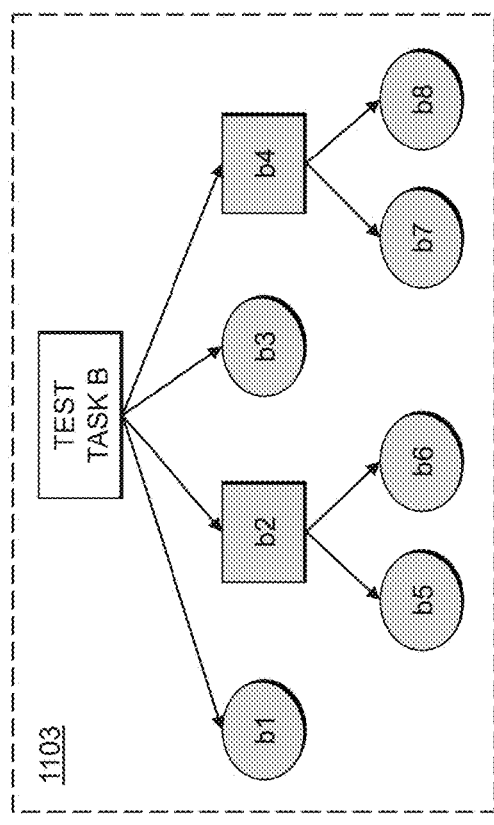
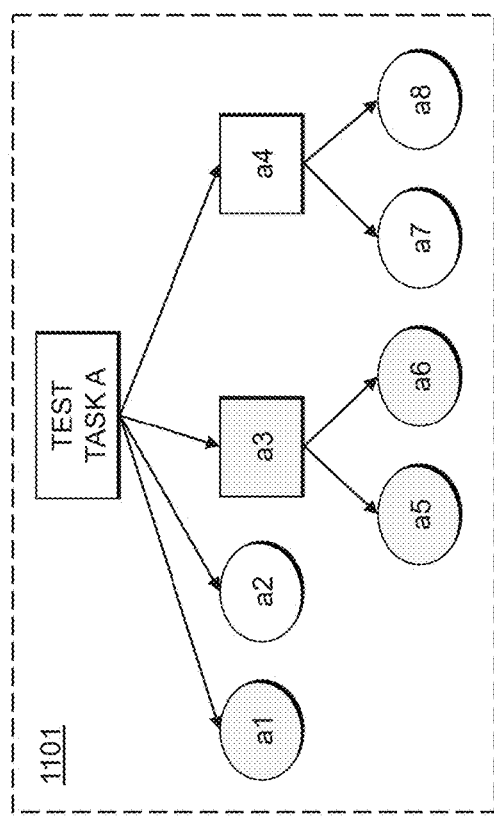
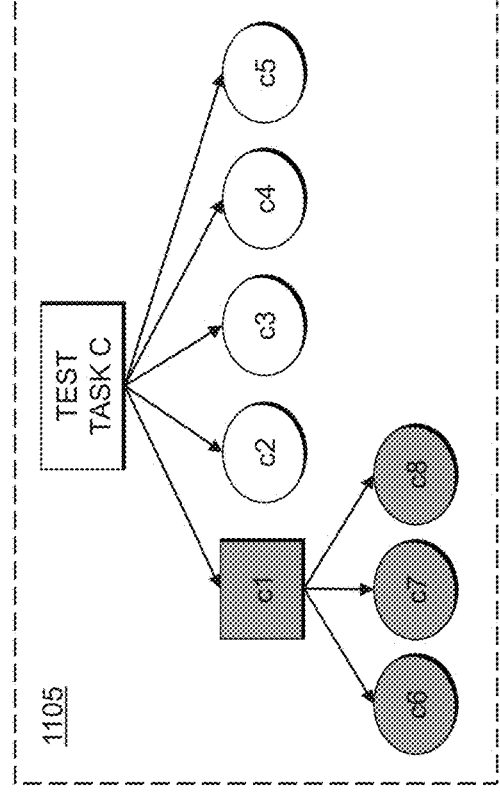
FIG. 11A

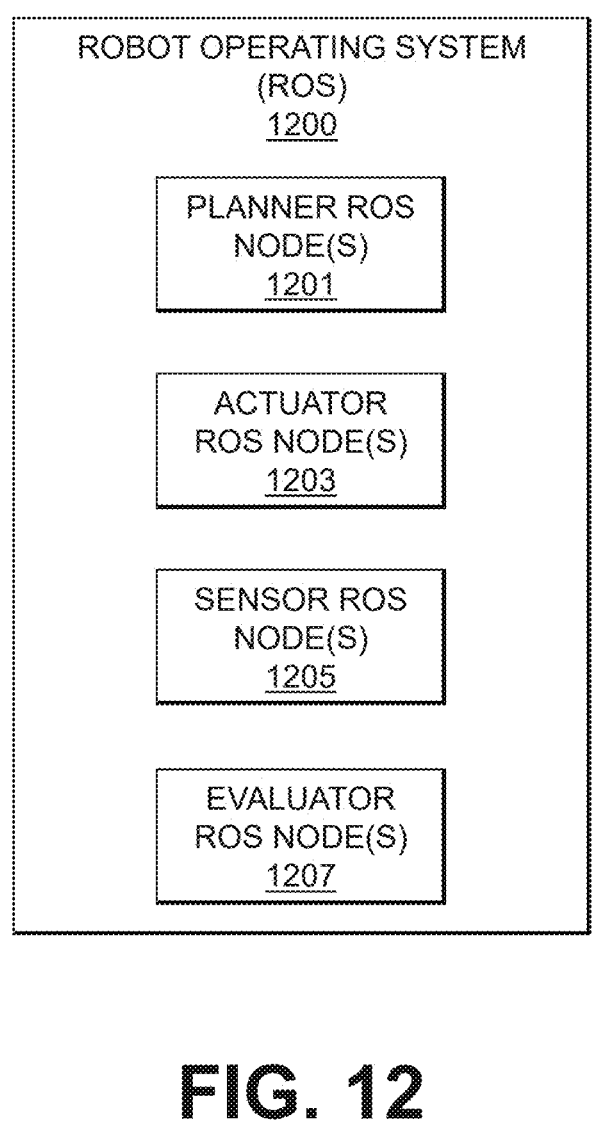

ROBOT OPERATING SYSTEM
(ROS)
1200

PLANNER ROS
NODE(S)
1201

ACTUATOR
ROS NODE(S)
1203

SENSOR ROS
NODE(S)
1205

EVALUATOR
ROS NODE(S)
1207

FIG. 12

MACHINE LEARNING-BASED GENERATION OF TESTING PLANS FOR TESTING OF INFORMATION TECHNOLOGY ASSETS

RELATED APPLICATION

The present application claims priority to Chinese Patent Application No. 202210401015.3, filed on Apr. 14, 2022 and entitled "Machine Learning-Based Generation of Testing Plans for Testing of Information Technology Assets," which is incorporated by reference herein in its entirety.

FIELD

The field relates generally to information processing, and more particularly to management of information processing systems.

BACKGROUND

Software development processes typically include multiple environments, such as one or more development environments, an integration testing environment, a staging environment, and a production environment. New software code may be created by individual developers or small teams of developers in respective ones of the development environments. The integration environment provides a common environment where software code from the multiple developers is combined and tested before being provided to the staging environment. The staging environment is designed to emulate the production environment and may be used for final review and approval before new software code is deployed in production applications in the production environment.

SUMMARY

Illustrative embodiments of the present disclosure provide techniques for machine learning-based generation of testing plans for testing of information technology assets.

In one embodiment, an apparatus comprises at least one processing device comprising a processor coupled to a memory. The at least one processing device is configured to perform the steps of determining one or more testing goals for testing to be performed on one or more of a plurality of information technology assets of an information technology infrastructure and selecting two or more testing plans of a plurality of testing plans based at least in part on scores assigned to respective ones of the plurality of testing plans, the assigned scores characterizing whether respective ones of the plurality of testing plans meet the determined one or more testing goals. The at least one processing device is further configured to perform the steps of generating, utilizing one or more machine learning-based genetic algorithms that take as input the selected two or more testing plans, one or more additional testing plans, and executing the one or more additional testing plans on the one or more of the plurality of information technology assets of the information technology infrastructure.

These and other illustrative embodiments include, without limitation, methods, apparatus, networks, systems and processor-readable storage media.

BRIEF DESCRIPTION OF THE DRAWINGS

FIG. 2 is a flow diagram of an exemplary process for machine learning-based generation of testing plans for testing of information technology assets in an illustrative embodiment.

FIGS. 3A and 3B show a system flow and algorithm for self-driven artificial intelligence goal-based test planning in an illustrative embodiment.

FIG. 7 shows a representation of system write cache state in an illustrative embodiment.

FIG. 8 shows mutable elements of a behavior tree represented in a list structure in an illustrative embodiment.

FIGS. 11A-11E show examples of genetic algorithm crossover and mutation with behavior tree representations of testing tasks in an illustrative embodiment.

FIG. 12 shows a robot operating system middleware suite for management of testing plans in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
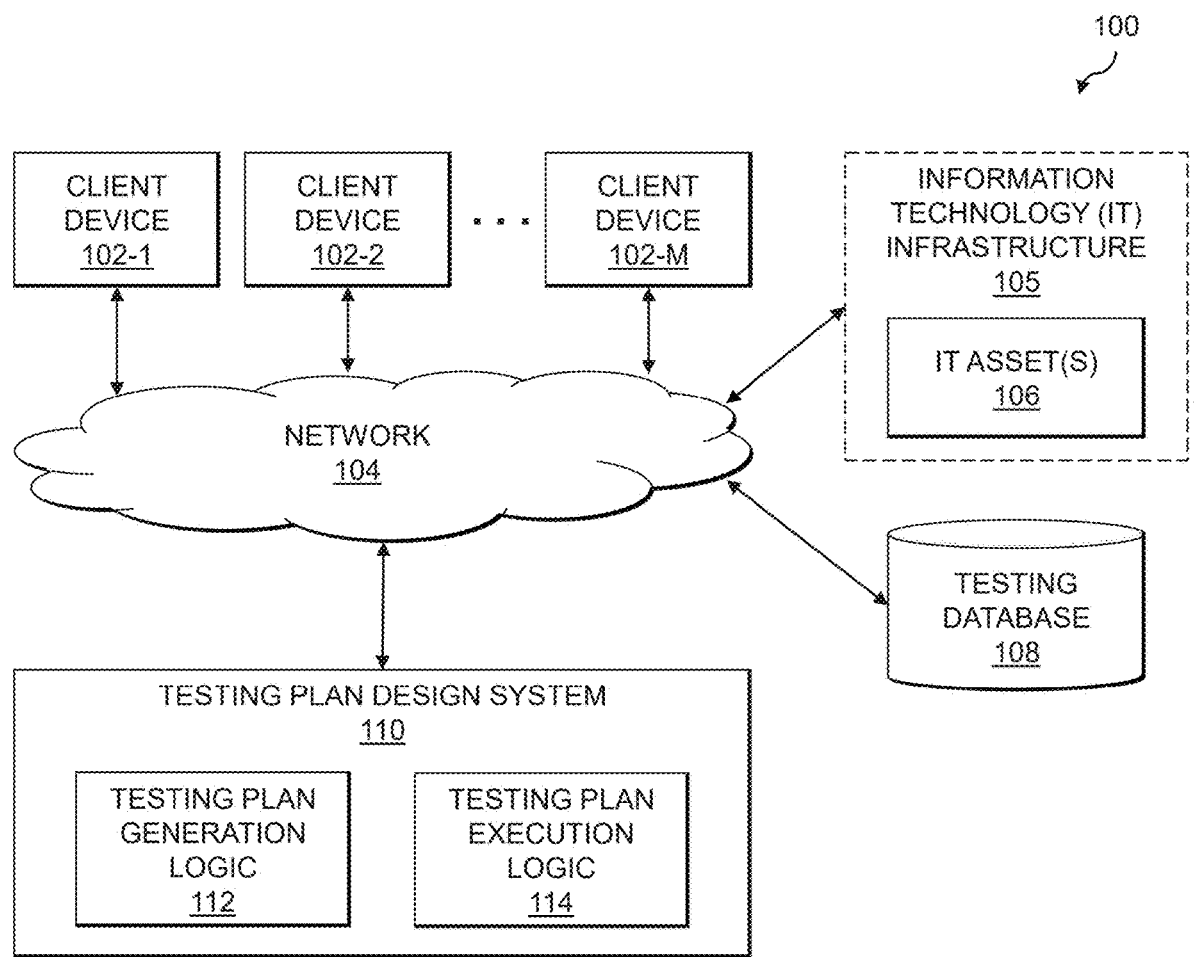
FIG. 1 is a block diagram of an information processing system configured for machine learning-based generation of testing plans for testing of information technology assets in an illustrative embodiment.

FIG. 1 shows an information processing system 100 configured in accordance with an illustrative embodiment. The information processing system 100 is assumed to be built on at least one processing platform and provides functionality for machine learning-based generation of testing plans for testing of information technology (IT) assets. The information processing system 100 includes a set of client devices 102-1, 102-2, . . . 102-M (collectively, client devices 102) which are coupled to a network 104. Also coupled to the network 104 is an IT infrastructure 105 comprising one or more IT assets 106, a testing database 108, and a testing plan design system 110. The IT assets 106 may comprise physical and/or virtual computing resources in the IT infrastructure 105. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc.

The IT assets 106 of the IT infrastructure 105 may host applications that are utilized by respective ones of the client devices 102, such as in accordance with a client-server computer program architecture. In some embodiments, the applications comprise web applications designed for delivery from assets in the IT infrastructure 105 to users (e.g., of client devices 102) over the network 104. Various other examples are possible, such as where one or more applications are used internal to the IT infrastructure 105 and not exposed to the client devices 102. It should be appreciated that, in some embodiments, some of the IT assets 106 of the IT infrastructure 105 may themselves be viewed as applications or more generally software or hardware that is to be tested. For example, ones of the IT assets 106 that are virtual computing resources implemented as software containers may represent software that is to be tested. As another example, ones of the IT assets 106 that are physical computing resources may represent hardware devices that are to be tested.

The testing plan design system 110 utilizes various information stored in the testing database 108 in designing testing plans for use in testing the IT assets 106, applications or other software running on the IT assets 106, etc. In some embodiments, the testing plan design system 110 is used for an enterprise system. For example, an enterprise may subscribe to or otherwise utilize the testing plan design system 110 for generating and running testing plans (e.g., on the IT assets 106 of the IT infrastructure 105, on client devices 102 operated by users of the enterprise, etc.). As used herein, the term "enterprise system" is intended to be construed broadly to include any group of systems or other computing devices. For example, the IT assets 106 of the IT infrastructure 105 may provide a portion of one or more enterprise systems. A given enterprise system may also or alternatively include one or more of the client devices 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different business, organizations or other entities).

The client devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as VMs, containers, etc.

The client devices 102 in some embodiments comprise respective computers associated with a particular company, organization or other enterprise. Thus, the client devices 102 may be considered examples of assets of an enterprise system. In addition, at least portions of the information processing system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

The testing database 108, as discussed above, is configured to store and record various information that is used by the testing plan design system 110 in designing testing plans for use in testing the IT assets 106, applications or other software running on the IT assets 106. Such information may include, but is not limited to, information regarding test actions, test tasks, testing objectives, testing points, test coverage, testing plans, etc. The testing database 108 in some embodiments is implemented using one or more storage systems or devices associated with the testing plan design system 110. In some embodiments, one or more of the storage systems utilized to implement the testing database 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the testing plan design system 110, as well as to support communication between the testing plan design system 110 and other related systems and devices not explicitly shown.

The client devices 102 are configured to access or otherwise utilize the IT infrastructure 105. In some embodiments, the client devices 102 are assumed to be associated with system administrators, IT managers or other authorized personnel responsible for managing the IT assets 106 of the IT infrastructure 105 (e.g., where such management includes performing testing of the IT assets 106, or of applications or other software that runs on the IT assets 106). For example, a given one of the client devices 102 may be operated by a user to access a graphical user interface (GUI) provided by the testing plan design system 110 to manage testing plans (e.g., create, review, execute, etc.). The testing plan design system 110 may be provided as a cloud service that is accessible by the given client device 102 to allow the user thereof to manage testing plans. In some embodiments, the IT assets 106 of the IT infrastructure 105 are owned or operated by the same enterprise that operates the testing plan design system 110 (e.g., where an enterprise such as a business provides support for the assets it operates). In other embodiments, the IT assets 106 of the IT infrastructure 105 may be owned or operated by one or more enterprises different than the enterprise which operates the testing plan design system 110 (e.g., a first enterprise provides support for assets that are owned by multiple different customers, business, etc.). Various other examples are possible.

In other embodiments, the testing plan design system 110 may provide support for testing of the client devices 102, instead of or in addition to providing support for the IT assets 106 of the IT infrastructure 105. For example, the testing plan design system 110 may be operated by a hardware vendor that manufactures and sells computing devices (e.g., desktops, laptops, tablets, smartphones, etc.), and the client devices 102 represent computing devices sold by that hardware vendor. The testing plan design system 110 may also or alternatively be operated by a software vendor that produces and sells software (e.g., applications) that runs on the client devices 102. The testing plan design system 110, however, is not required to be operated by any single hardware or software vendor. Instead, the testing plan design system 110 may be offered as a service to provide support for computing devices or software that are sold by any number of hardware or software vendors. The client devices 102 may subscribe to the testing plan design system 110, so as to provide support for testing of the client devices 102 or software running thereon. Various other examples are possible.

In some embodiments, the client devices 102 may implement host agents that are configured for automated transmission of information regarding state of the client devices 102 (e.g., such as in the form of testing logs or other test plan execution and evaluation results which are periodically provided to the testing database 108 and/or the testing plan design system 110). Such host agents may also or alternatively be configured to automatically receive from the testing plan design system 110 commands to execute remote actions (e.g., to run various testing plans on the client devices 102 and/or the IT assets 106 of the IT infrastructure 105). Host agents may similarly be deployed on the IT assets 106 of the IT infrastructure 105.

It should be noted that a "host agent" as this term is generally used herein may comprise an automated entity, such as a software entity running on a processing device. Accordingly, a host agent need not be a human entity.

The testing plan design system 110 in the FIG. 1 embodiment is assumed to be implemented using at least one processing device. Each such processing device generally comprises at least one processor and an associated memory, and implements one or more functional modules or logic for controlling certain features of the testing plan design system 110. In the FIG. 1 embodiment, the testing plan design system 110 comprises the testing plan generation logic 112 and the testing plan execution logic 114. The testing plan generation logic 112 is configured to determine one or more testing goals for testing to be performed on one or more of the IT assets 106 of the IT infrastructure 105. The testing plan generation logic 112 is also configured to select two or more of a plurality of testing plans from the testing database 108 based at least in part on scores assigned to respective ones of a plurality of testing plans. The assigned scores characterize whether respective ones of the plurality of testing plans meet the determined one or more testing goals. The testing plan generation logic 112 is further configured to generate, utilizing one or more machine learning-based genetic algorithms that take as input the selected two or more testing plans, one or more additional testing plans. The testing plan execution logic 114 is configured to execute the one or more additional testing plans on one or more of the IT assets 106 of the IT infrastructure 105. The testing plan generation logic 112 may be further configured to evaluate, based at least in part on execution results of the one or more additional testing plans on the IT assets 106 of the IT infrastructure 105, whether the one or more additional testing plans meet the determined one or more testing goals, and to assign scores to the one or more additional testing plans based at least in part on the evaluation. The testing plan generation logic 112 may be further configured to modifying the plurality of testing plans (e.g., by adding ones of the one or more additional testing plans having assigned scores exceeding a designated threshold, by removing one or more of the testing plans having assigned scores below a designated threshold), where the modified plurality of testing plans is utilized for one or more subsequent iterations of selecting two or more of the testing plans and generating additional testing plans.

It is to be appreciated that the particular arrangement of the client devices 102, the IT infrastructure 105 and the testing plan design system 110 illustrated in the FIG. 1 embodiment is presented by way of example only, and alternative arrangements can be used in other embodiments. As discussed above, for example, the testing plan design system 110 (or portions of components thereof, such as one or more of the testing plan generation logic 112 and the testing plan execution logic 114) may in some embodiments be implemented internal to one or more of the client devices 102 and/or the IT infrastructure 105.

At least portions of the testing plan generation logic 112 and the testing plan execution logic 114 may be implemented at least in part in the form of software that is stored in memory and executed by a processor.

The testing plan design system 110 and other portions of the information processing system 100, as will be described in further detail below, may be part of cloud infrastructure.

The testing plan design system 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 102, IT infrastructure 105, the testing database 108 and the testing plan design system 110 or components thereof (e.g., the testing plan generation logic 112 and the testing plan execution logic 114) may be implemented on respective distinct processing platforms, although numerous other arrangements are possible. For example, in some embodiments at least portions of the testing plan design system 110 and one or more of the client devices 102, the IT infrastructure 105 and/or the testing database 108 are implemented on the same processing platform. A given client device (e.g., 102-1) can therefore be implemented at least in part within at least one processing platform that implements at least a portion of the testing plan design system 110.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the client devices 102, the IT infrastructure 105, IT assets 106, the testing database 108 and the testing plan design system 110, or portions or components thereof, to reside in different data centers. Numerous other distributed implementations are possible. The testing plan design system 110 can also be implemented in a distributed manner across multiple data centers.

Additional examples of processing platforms utilized to implement the testing plan design system 110 and other components of the information processing system 100 in illustrative embodiments will be described in more detail below in conjunction with FIGS. 13 and 14.

It is to be appreciated that these and other features of illustrative embodiments are presented by way of example only, and should not be construed as limiting in any way.

It is to be understood that the particular set of elements shown in FIG. 1 for machine learning-based generation of testing plans for testing of IT assets is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for machine learning-based generation of testing plans for testing of IT assets will now be described in more detail with reference to the flow diagram of FIG. 2. It is to be understood that this particular process is only an example, and that additional or alternative processes for machine learning-based generation of testing plans for testing of IT assets may be used in other embodiments.

In this embodiment, the process includes steps 200 through 212. These steps are assumed to be performed by the testing plan design system 110 utilizing the testing plan generation logic 112 and the testing plan execution logic 114. The process begins with step 200, determining one or more testing goals for testing to be performed on one or more of a plurality of IT assets (e.g., 106) of an IT infrastructure (e.g., 105). The testing to be performed may comprise testing of a write cache of a storage system. A given one of the one or more testing goals may comprise determining a balance among two or more states of the write cache of the storage system over a designated period of time. A given one of the one or more testing goals may alternatively comprise determining at least one of an order and a timing of traversal of two or more states of the write cache of the storage system over a designated period of time.

Two or more of a plurality of testing plans (e.g., from a testing database 108) are selected in step 202 based at least in part on scores assigned to respective ones of the plurality of testing plans. The assigned scores characterize whether respective ones of the plurality of testing plans meet the determined one or more testing goals. At least a given one of the selected two or more testing plans may comprise a behavior tree, the behavior tree comprising a plurality of nodes representing one or more testing tasks. The plurality of nodes may comprise one or more execution nodes representing one or more test actions and one or more control flow nodes connecting two or more of the plurality of nodes. A given one of the selected two or more testing plans may comprise a set of two or more testing task behavior sub-trees, each of the set of two or more testing task behavior sub-trees comprising at least one execution node representing at least one test action.

One or more additional testing plan are generated in step 204 utilizing one or more machine learning-based genetic algorithms that take as input the selected two or more testing plans. Step 204 may comprise applying one or more genetic algorithm operators of the one or more machine learning-based genetic algorithms to at least one of the selected two or more testing plans. The one or more genetic algorithm operators of the one or more machine learning-based genetic algorithms may comprise a crossover operation applied to first and second ones of the selected two or more testing plans to generate a given one of the one or more additional testing plans. The one or more genetic algorithm operators of the one or more machine learning-based genetic algorithms may also or alternatively comprise a mutation operation applied to a given one of the selected two or more testing plans to generate a given one of the one or more additional testing plans. The one or more genetic algorithm operators of the one or more machine learning-based genetic algorithms may comprise a sequence of two or more genetic algorithm operators. The sequence of the two or more genetic algorithm operators may comprise at least one crossover operation applied to first and second ones of the selected two or more testing plans to generate an intermediate testing plan, and at least one mutation operation applied to the intermediate testing plan to generate a given one of the one or more additional testing plans. The sequence of the two or more genetic algorithm operators may alternatively comprise at least one mutation operation applied to a first one of the selected two or more testing plans to generate an intermediate testing plan, and at least one crossover operation applied to the intermediate testing plan and a second one of the selected two or more testing plans to generate a given one of the one or more additional testing plans.

The FIG. 2 process continues with step 206, executing the one or more additional testing plans on the one or more of the plurality of IT assets of the IT infrastructure. In step 208, an evaluation is performed to determine whether the one or more additional testing plans meet the determined one or more testing goals. The evaluation is based at least in part on execution results of the one or more additional testing plans on the one or more of the plurality of IT assets of the IT infrastructure. Scores are assigned to the one or more additional testing plans in step 210 based at least in part on the evaluation in step 208. In step 212, the plurality of testing plans is modified by adding ones of the one or more additional testing plans having assigned scores exceeding a designated threshold. Step 212 may also include removing one or more of the testing plans having assigned scores below a designated threshold. The FIG. 2 process may then proceed with one or more subsequent iterations of steps 202 through 212 utilizing the modified plurality of testing plans.

From a system interface point of view, the number of operations for various types of IT assets such as storage systems is finite. System interfaces of storage systems, for example, may be categorized as data paths (e.g., Internet Small Computer Systems Interface (iSCSI), Fibre Channel (FC), Network File System (NFS), Common Internet File System (CIFS), etc.), control paths (e.g., Command Line Interface (CLI), Graphical User Interface (GUI), etc.), etc. Functional and integration testing of IT assets may be focused on the correctness of one or more functions in a specific area.

In system testing, in addition to testing functional correctness, various other parameters may be tested including but not limited to system performance, endurance, stability, robustness, etc. These and other parameters may be tested with various combinations and permutations of operations through the system interfaces of the system (e.g., the IT asset) being tested. The more combinations that are available, the better test coverage may be achieved. The combinations and permutations of input operations may be considered infinite from spatial and temporal dimensions. In system test automation, one or more testing application programming interfaces (APIs) are implemented in a testing framework, where test scripts can call the testing APIs for code reuse. There is still a need, however, to write test scripts for each testing scenario and it is not feasible to cover all the possible combinations of testing scenarios which, as noted above, may be infinite in spatial and temporal dimensions. Although randomized combinations of testing scenarios can increase the coverage to some extent, there are still various drawbacks with conventional testing automation approaches. Such disadvantages include, but are not limited to: that scripted methods cannot enumerate all possible testing combinations; that some testing scenarios are inter-dependent and cannot be combined randomly; and that randomization introduces uncertainty and inefficiency.

Illustrative embodiments provide approaches for addressing various problems and drawbacks of conventional testing automation approaches. The solutions described herein are able to generate testing plans dynamically based on finite building blocks with one or more testing goals as direction. In some embodiments, a structural, modular and adaptable execution plan model is provided, which combines testing operations dynamically to achieve a testing task with given conditions. The model is able to direct the dynamic combination of testing operations in accordance with one or more testing goals rather than relying on randomized combinations. The solutions described herein are thus able to sustainably and continuously enhance system testing automation. In some embodiments, techniques from gaming, robotic agent control and evolution are leveraged to propose new ways for system testing automation that provide a goal-based evolutionary approach using behavior trees.

A behavior tree is a plan model that is used in developing non-player characters (NPCs) in gaming, in robotic control, and various other areas. Genetic algorithms (GAs) may use behavior trees to find optimal or near optimal solutions to complex non-linear problems. A behavior tree is a mathematical model of plan execution used in computer science, robotics, control systems and video games. It describes switching between a finite set of tasks in a modular fashion. Its strength comes from its ability to create very complex tasks or behaviors that are composed of simple tasks, without worrying how the simple tasks are implemented.

A behavior tree is graphically represented as a directed tree in which the nodes are classified as control flow nodes, or execution nodes (e.g., tasks). Execution nodes form the leaves of a behavior tree, and they define low-level basic actions. Examples of basic actions for a storage system include, for example, starting IO to a volume, checking volume capacity, etc. Control flow nodes are used to combine execution nodes and/or control flow nodes to achieve more complex tasks. The execution of a behavior tree starts from the root which sends ticks with a certain frequency to its child (ren). A tick is an enabling signal that allows execution of a child. When the execution of a node in the behavior tree is allowed, it returns to the parent a status of "running" if its execution has not finished yet, a status of "success" if it has achieved its goal, or a status of "failure" otherwise. Behavior trees may be created during initialization, and may dynamically change during execution by pruning or inserting execution nodes or sub-trees to control flow nodes.

GAs are a form of machine learning that is based on natural biological evolution, which is well-suited for solving sophisticated optimization problems. The application of GAs and genetic programming has seen positive results in various fields, including robotics. In some applications, GAs are used for classifying data correctly, where multiple candidate hypotheses are evolved and generated from preceding populations using combinations of genetic operators such as crossover (also referred to as recombination) and mutation. Such genetic operators mimic the inheritance of chromosomes in organisms. The general process flow for a GA includes:

1. Start.
2. Generate an initial population (manually or randomly).
3. Compute a fitness function.
4. Repeat:
   a) Selection;
   b) Crossover and Mutation; and
   c) Computing Fitness.
5. Until the goal is achieved, or a designated stopping condition is reached (e.g., a threshold number of generations).
6. Stop.

Figure 3A:
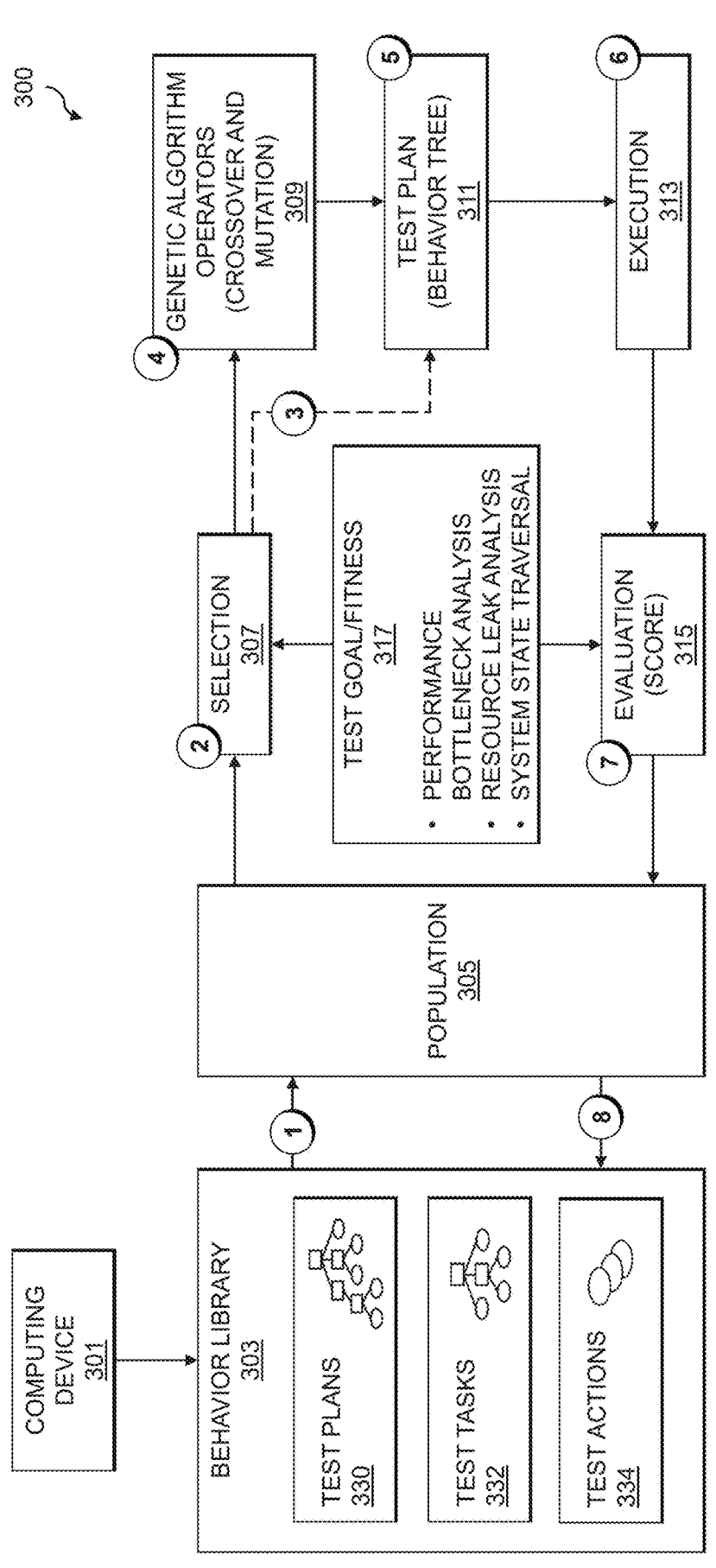

FIGS. 3A and 3B show a system flow 300 and algorithm 350 for self-driven AI goal-based test planning. The self-driven AI goal-based test planning system is able to plan and adjust testing behaviors dynamically and intelligently to achieve one or more specified testing goals. FIG. 3A shows the system flow 300 for testing a computing device 301. A behavior library 303 is generated for the computing device 301 (e.g., characterizing system interfaces of the computing device 301). The behavior library 303 includes one or more test plans 330, one or more test tasks 332 and one or more test actions 334. The system flow 300 includes steps 1-8:

1. Initialize a population 305 from the behavior library 303.
2. Perform selection 307 from the population 305 (e.g., of one or more of the test plans 330, test tasks 332 and test actions 334).
3. The selected test plans 330, test tasks 332 and test actions 334 are provided to a testing plan 311.
4. GA operators 309 (e.g., crossover and mutation) are applied to the selected test plans 330, test tasks 332 and test actions 334 in generating the test plan 311.
5. A behavior tree for the test plan 311 is generated.
6. The test plan 311 is executed 313 on the computing device 301.
7. Execution 313 of the test plan 311 is evaluated 315 (e.g., to generate a score).
8. The population 305 is updated (e.g., with any new test plans, test tasks and/or test actions in the test plan 311), with such updates being propagated to the behavior library 303 for use in further iterations of the system flow 300.

The evaluation 315 may be used in characterizing testing goals and fitness function 317 of the execution 313 of the test plan 311. This may include, but is not limited to, performance bottleneck analysis, resource leak analysis, system state traversal, etc. FIG. 3B shows an algorithm 350 (e.g., pseudocode) for execution of the system flow 300, with the steps 1-8 being labeled in the pseudocode of the algorithm.

The behavior library 303 may include all execution nodes, flow control nodes and behavior trees (or sub-trees) composed of the execution nodes and the flow control nodes. The elements in the behavior library 303 are categorized into: the test plans 330, the test tasks 332 and the test actions 334. The test actions 334 represent actions which cause an execution of methods or functions in system testing (e.g., where the computing device 301 is a storage system, the test actions 334 may include starting IO operations, creating a filesystem, deleting a snapshot, checking filesystem capacity, etc.). The test actions 334 form the execution nodes in behavior trees. The test tasks 332 are compositions of multiple ones of the test actions 334 and/or other ones of the test tasks 332. The test tasks 332 rely extensively on internal state to achieve complex jobs (e.g., consuming 90% capacity of the filesystem, injecting a disk fault for 5 seconds, creating a snapshot when high IO workloads are ongoing, etc.). The test tasks 332 may be represented as sub-trees. The test plans 330 are typically groups of complete behavior trees, each composed of multiple sub-trees (e.g., multiple test tasks 332). The test plans 330 are created to test a target system (e.g., computing device 301) for one or more predefined goals.

Figure 4:
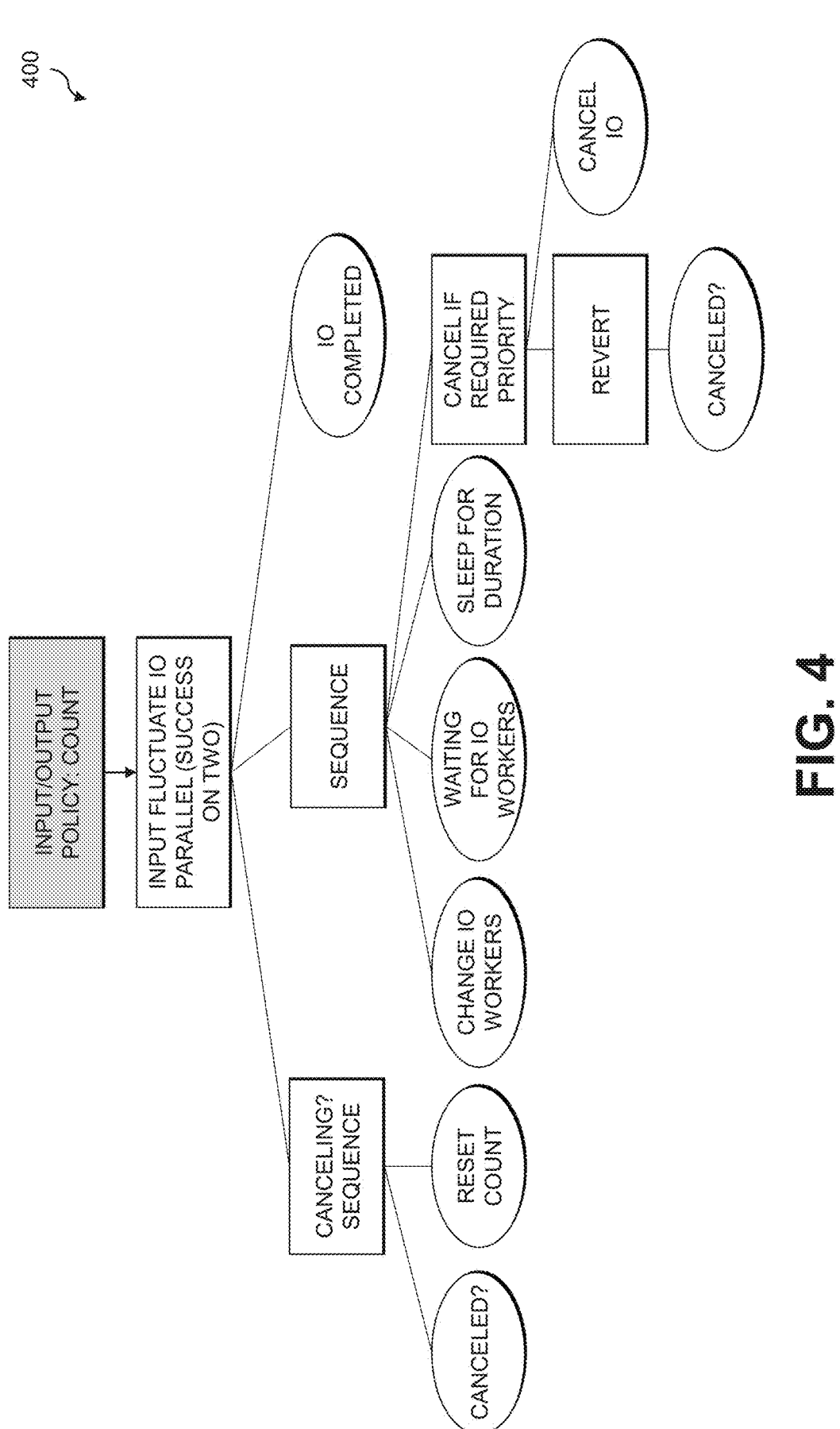
FIG. 4 shows a representation of an input-output policy count task with action and control flow nodes in an illustrative embodiment.
Figure 5:
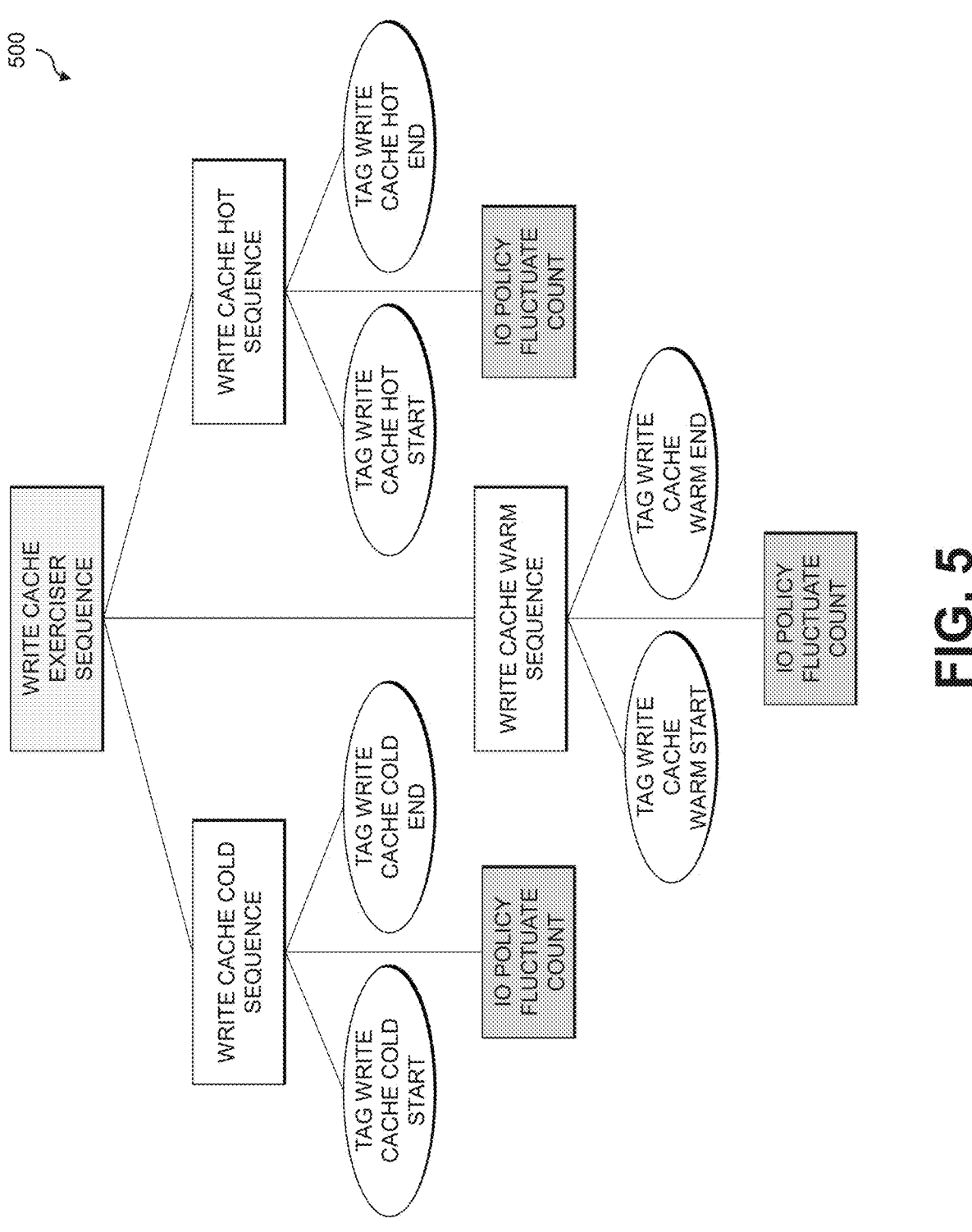
FIG. 5 shows a representation of a complex task for write cache management with task sub-trees and action nodes in an illustrative embodiment.
Figure 6:
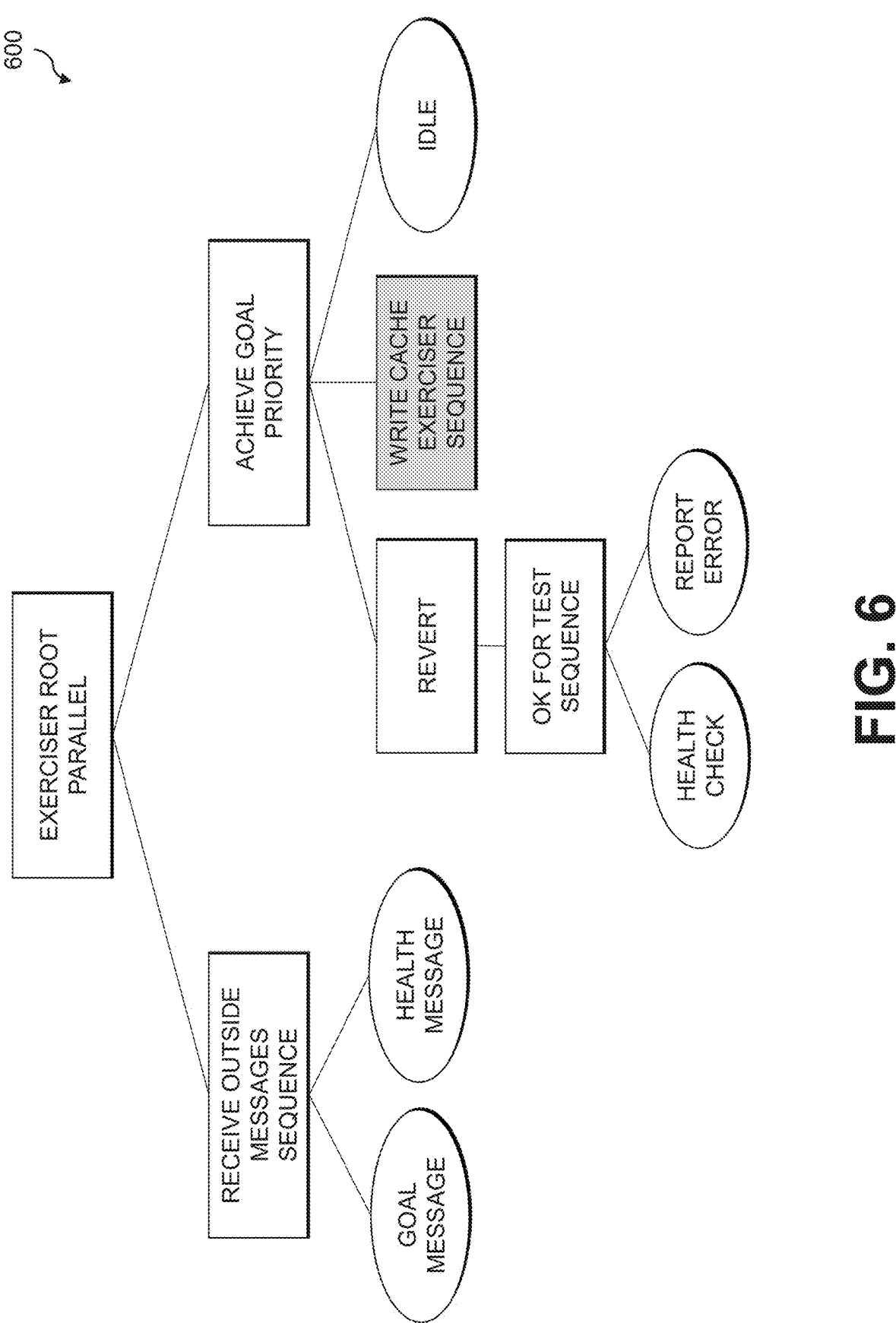
FIG. 6 shows a representation of an executable testing plan with a complete behavior tree composed with one or more complex tasks in an illustrative embodiment.

FIG. 4 shows an example sub-tree 400 (e.g., one of the test tasks 332), where multiple action nodes (e.g., oval nodes) and control flow nodes (e.g., rectangle nodes) compose a task (e.g., the shaded rectangle node). The test task shown in the FIG. 4 sub-tree 400 may linearly increase or decrease workload for N times, and the test task is cancelable in the middle. The particular test task shown in FIG. 4 is for an IO policy count, and includes parameters such as the IO count, maximum IO worker, minimum IO worker, duration, IO pattern, step, container orchestration (e.g., Kubernetes (K8S)) publisher, container orchestration (e.g., K8S) listener, etc. FIG. 5 shows an example of a complex task 500 that is composed of multiple other test task sub-trees and test actions. More particularly, the FIG. 5 complex task 500 is for exercising a write cache with a diverse IO range, and includes parameters such as the write cache size, cold threshold, warm threshold and hot threshold. FIG. 6 shows a complete behavior tree 600, which is composed of one or more complex tasks and forms an executable test plan (e.g., for parallel testing of a write cache exerciser, including the complex task 500 shown in FIG. 5).

The initial set of test plans 330 in the behavior library 303 may be generated manually (e.g., based on manual tester experience). Testers, for example can use a behavior tree editor (e.g., a GUI) to create and generate test plan descriptions as the initial population of the test plans 330 in the behavior library 303. Similarly, testers may manually generate one or more of the test tasks 332 and/or test actions 334 in the behavior library 303.

The testing goal or fitness function 317 includes one or more specified testing goals, with corresponding fitness functions that distinguish "good" behaviors (or a sequence of behaviors) from "bad" ones. For different testing goals, the fitness functions may be quite different. Two example testing goals and associated fitness functions will now be described for illustration.

A first testing goal is to traverse system write cache states (regardless of time). Based on the percentage of "dirty" pages, the system write cache can be working in any one of three states at any given time as shown in FIG. 7. FIG. 7 shows a definition of system write cache state 700, which includes cold, warm and hot states. The cold state corresponds to a dirty page ratio less than 33.3%, the warm state corresponds to a dirty page ratio greater than or equal to 33.3% and less than 66.7%, and the hot state corresponds to a dirty page ratio of at least 66.7% of all the system write cache pages. To be more specific, the percentage of dirty pages of a system write cache may be examined at each sample time, and then the occurrence counts of the cold, warm and hot states are updated accordingly. At the evaluation 315 time, the score of the current behavior (or sequence of behaviors) is determined according to:

$$F_{ergodicity} = \frac{I(\text{"Cold"}) + I(\text{"Warm"}) + I(\text{"Hot"})}{3} \times 100$$

$$F_{variance} = [C(\text{"Cold"}) - \mu]^2 + [C(\text{"Warm"}) - \mu]^2 + [C(\text{"Hot"}) - \mu]^2 =$$

$$F_{ergodicity} - F_{variance}$$

where C (state) is the cumulative occurrence count of each state, $$I(\text{state}) = \begin{cases} 1, & \text{if } C(\text{state}) \geq \text{threshold} \\ 0, & \text{otherwise} \end{cases}$$

and μ is the average occurrence count among the three states:

$$\mu = \frac{C(\text{"Cold"}) + C(\text{"Warm"}) + C(\text{"Hot"})}{3}$$

The higher the score, the better the behavior (or the sequence of behaviors). A score=100 means that the system write cache visits the three states in an extremely balanced manner.

A second testing goal is to traverse system write cache states (e.g., periodically). In this testing scenario, the goal is to exercise the system write cache and make it traverse among the states in order and periodically to address an associated cache entry replacement policy. The definition of the system write cache states is shown in FIG. 7, described above. The ratio of dirty pages is sampled periodically (e.g., with an identical interval). At every sample time n, a flag f[n] is saved that indicates the instant state of the system write cache:

$$f[n] = \begin{cases} -1, & \text{if dirty page ratio} < 33.3\% \\ 0, & \text{if } 33.3\% \leq \text{dirty page ratio} < 66.7\% \\ 1, & \text{otherwise} \end{cases}$$

In the evaluation process, the Discrete Fourier Transform of the discrete time series {f[n]}, n=0, 1, 2, . . . , N−1 is performed according to:

$$F(m) = \sum_{n=0}^{N-1} f(n)e^{-2\pi \frac{nm}{N} i}$$

The score is defined as the maximum of the largest frequency component minus the second largest frequency component of the spectrum:

$$\text{score} = \max\{F(m)\} - \text{second } \max\{F(m)\}$$

Similarly, the higher the score, the better the behavior (or the sequence of behaviors) in the context of periodic system cache state traversal.

After the test plans from the initial population 305 are executed 313, they are evaluated 315 based on the testing goals and fitness function 317. The run instances of the test plans are then given scores. Selection 307 involves picking a subset of the existing population 305 to carry forward to the next generation. In some embodiments, fitness proportionate selection is used. Individuals from the population 305 are selected based on the ratio of that individual test plan's fitness to the fitness of other test plans in the population 305. Thus, the probability of selecting an individual test plan x from a population 305 of n individuals is determined according to the following equation:

$$P(x) = \frac{\text{Fitess}(x)}{\sum_{i}^{n}\text{Fitness}(x_i)}$$

Once the individual test plans from the populations 305 are selected 307, the GA operators 309 are performed on the selected test plans.

Figure 8:
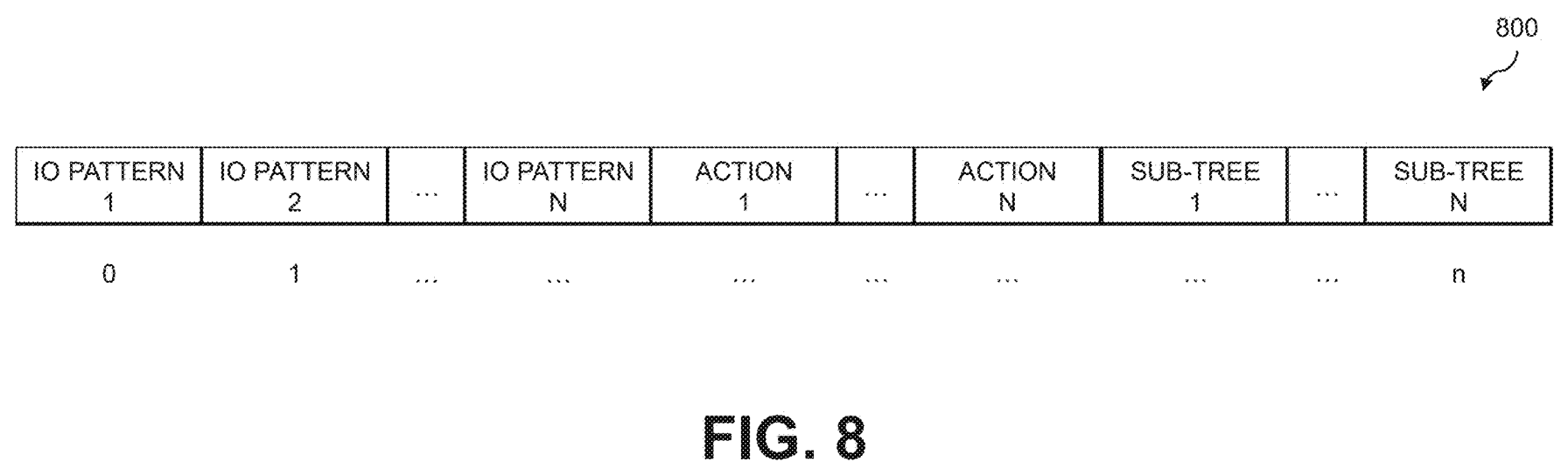

For a behavior tree, the mutable elements may include: (1) stateless actions; (2) sub-trees for the same or similar tasks; and (3) parameters such as IO patterns. Such mutable elements may be represented by a list structure 800 as shown in FIG. 8, including a set of IO patterns 1 to N, a set of actions 1 to N, and a set of sub-trees 1 to N, with the mutable elements being associated with respective indexes 0, 1, . . . n. In some embodiments, the GA operators 309 include recombination/crossover and mutation.

Figure 9:
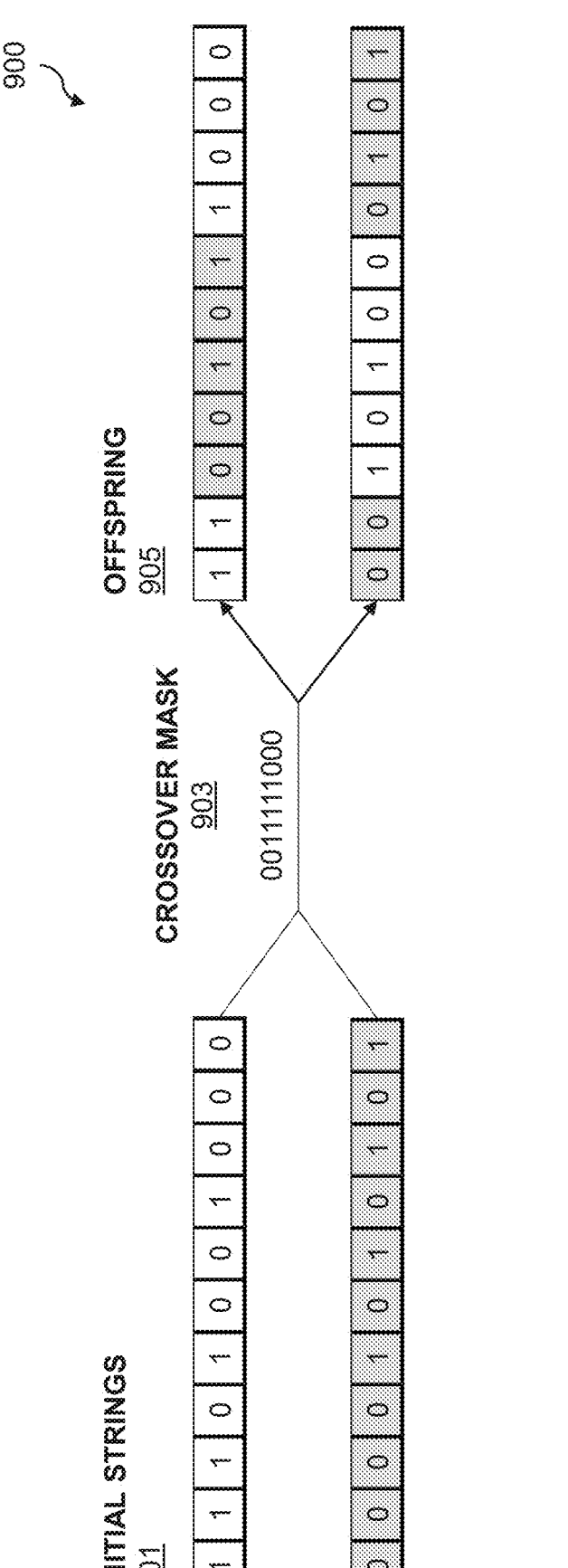
FIG. 9 shows an example of a crossover genetic algorithm operator in an illustrative embodiment.

In recombination or crossover, two "parents" (e.g., two test tasks or test plans) are selected, and two "offspring" are produced by copying the ith bit of the mutable list from each of the parents, where the choice of which parent to receive the ith bit is defined by a crossover mask. By varying the crossover mask, the offspring can inherit varying portions from the parents and, in doing so, aids in the diversity for the next generation. FIG. 9 shows an example of recombination or crossover 900, in which a set of initial strings 901 (e.g., parents) are used to generate offspring 905 based on a crossover mask 903.

Figure 10:
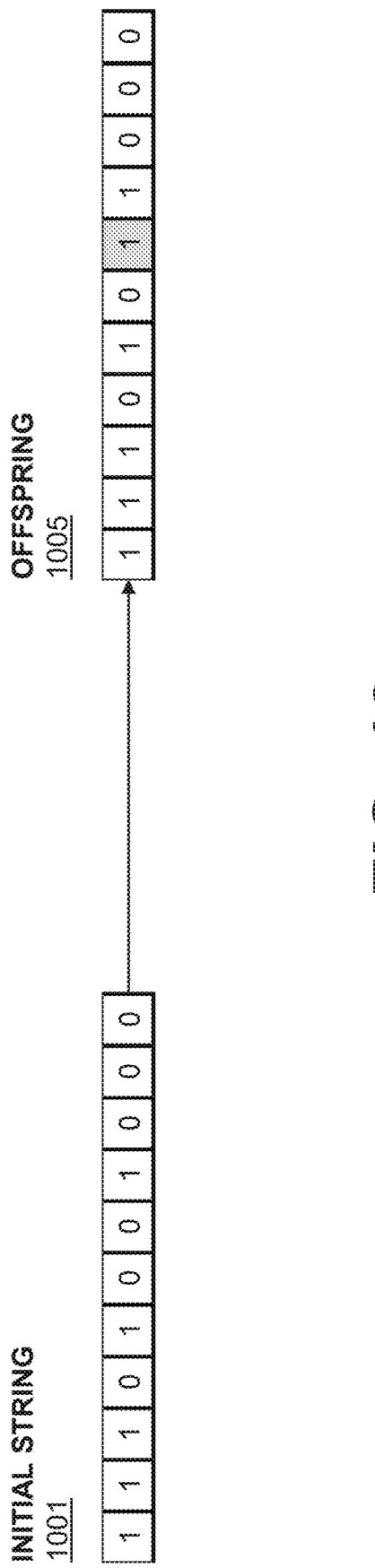
FIG. 10 shows an example of a mutation genetic algorithm operator in an illustrative embodiment.

The mutation operator produces offspring by modifying just a single parent, with the offspring being produced by modification to one or more bits of the parent. FIG. 10 shows an example of mutation 1000, where an initial string 1001 is converted to offspring 1005 by a single, random modification to one bit (e.g., in the seventh position shaded gray in the offspring 1005).

Figure 11B:
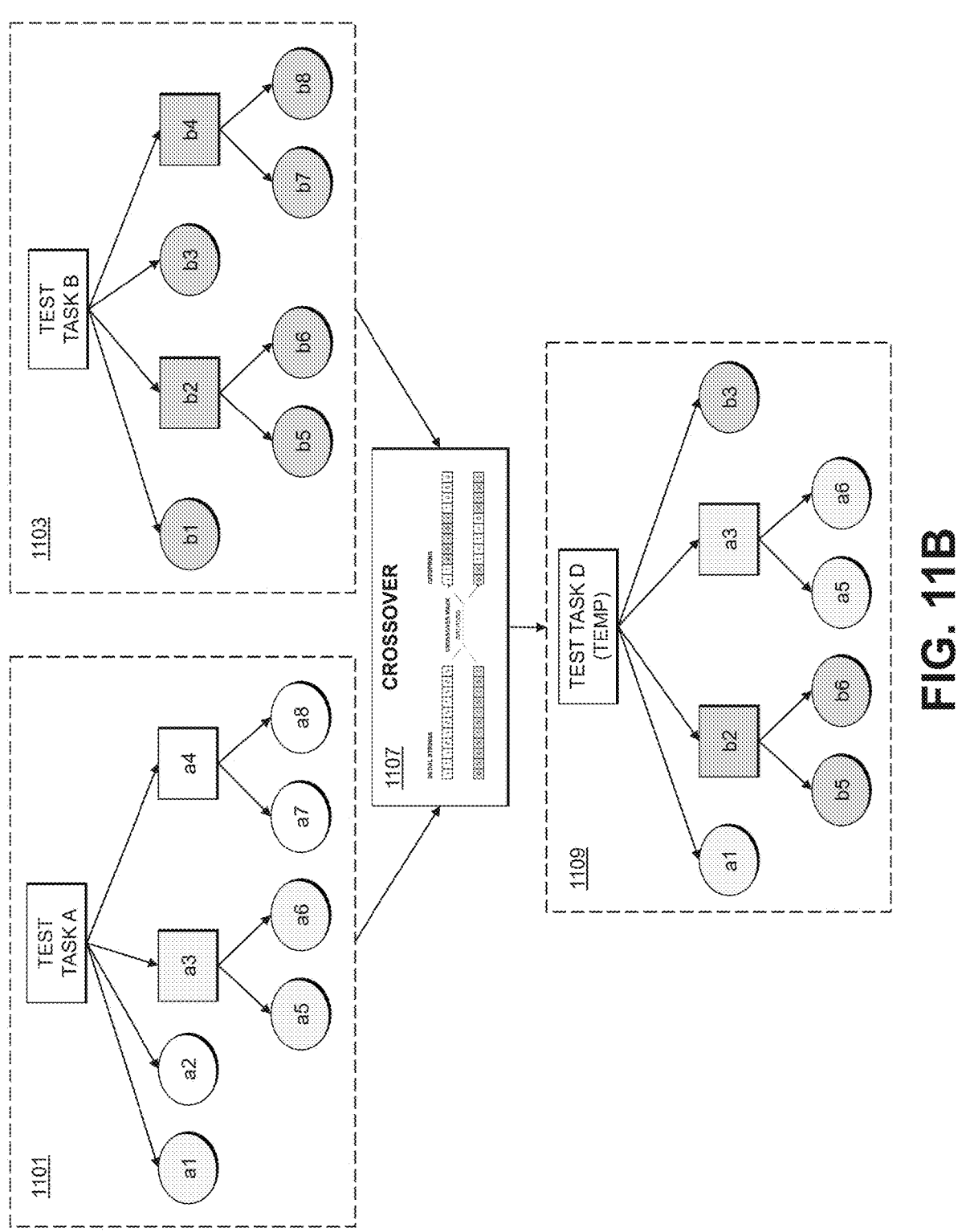

Application of GA operators 309 with behavior trees representing test tasks is illustrated in FIGS. 11A-11E. FIG. 11A shows three input or parent behavior trees 1101, 1103 and 1105 representing test tasks A, B and C. The behavior tree 1101 for test task A includes action nodes a1, a2, a5, a6, a7 and a8, as well as control flow nodes a3 and a4. The behavior tree 1103 for test task B includes action nodes b1, b3, b5, b6, b7 and b8, as well as control flow nodes b2 and b4. The behavior tree 1105 for test task C includes actions nodes c2, c3, c4, c5, c6, c7 and c8, as well as control flow node c1. FIG. 11B shows application of crossover 1107 to the behavior trees 1101 and 1103 for test tasks A and B, resulting in an intermediate or temporary new test task D with an associated behavior tree 1109. The behavior tree 1109 for temporary test task D includes action nodes a1, b3, b5, b6, a5 and a6, as well as control flow nodes b2 and a3.

Figure 11C:
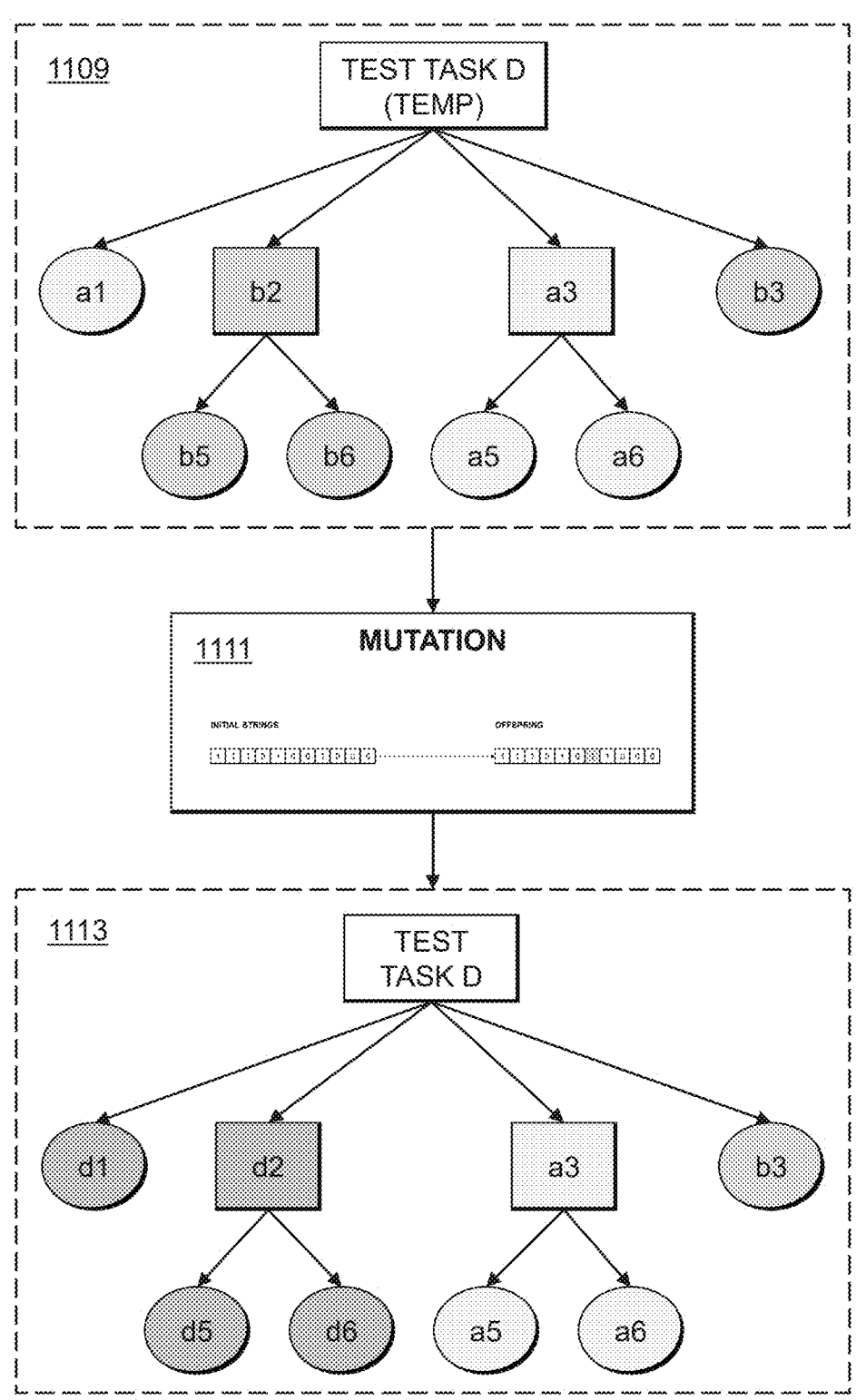
Figure 11D:
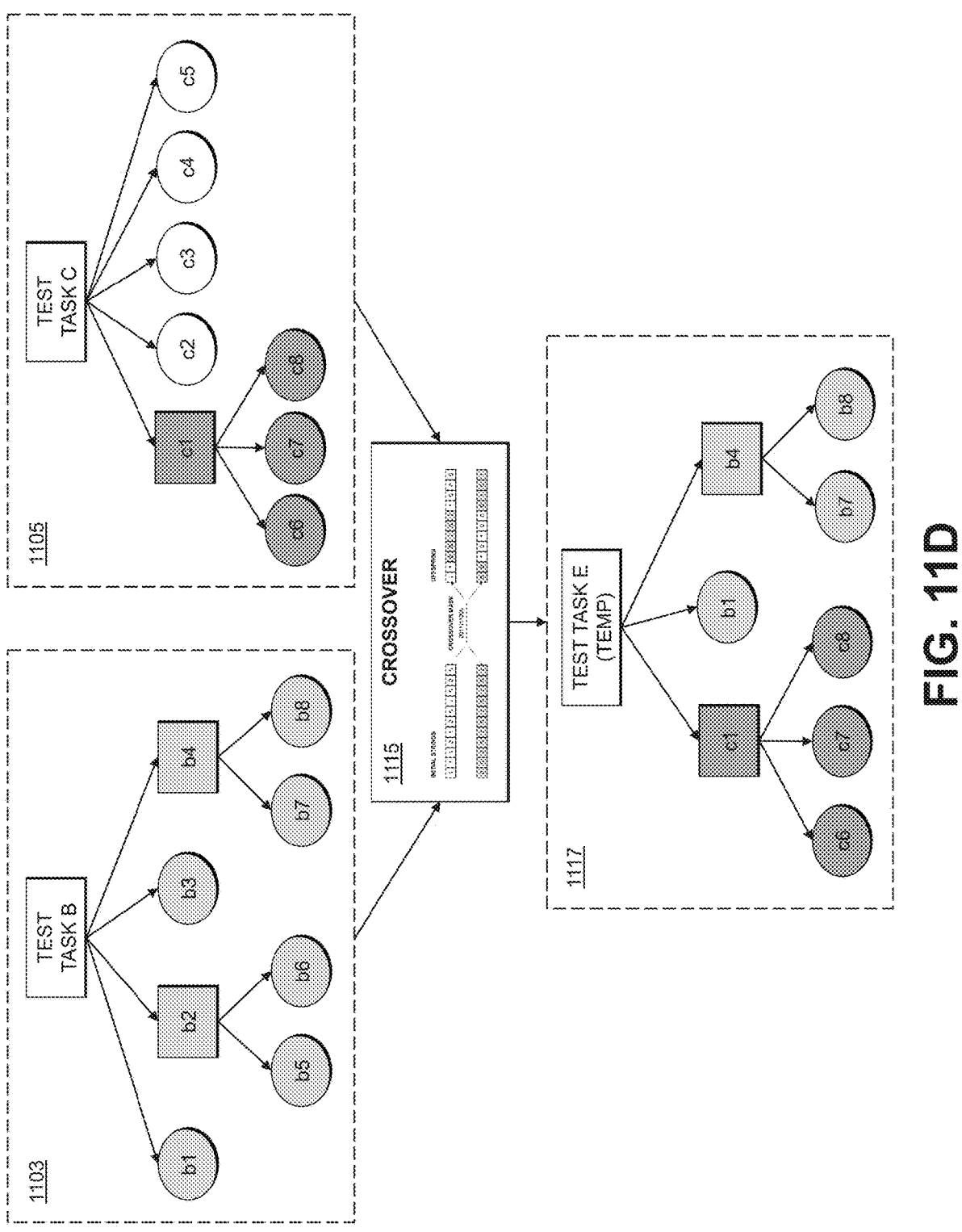
Figure 11E:
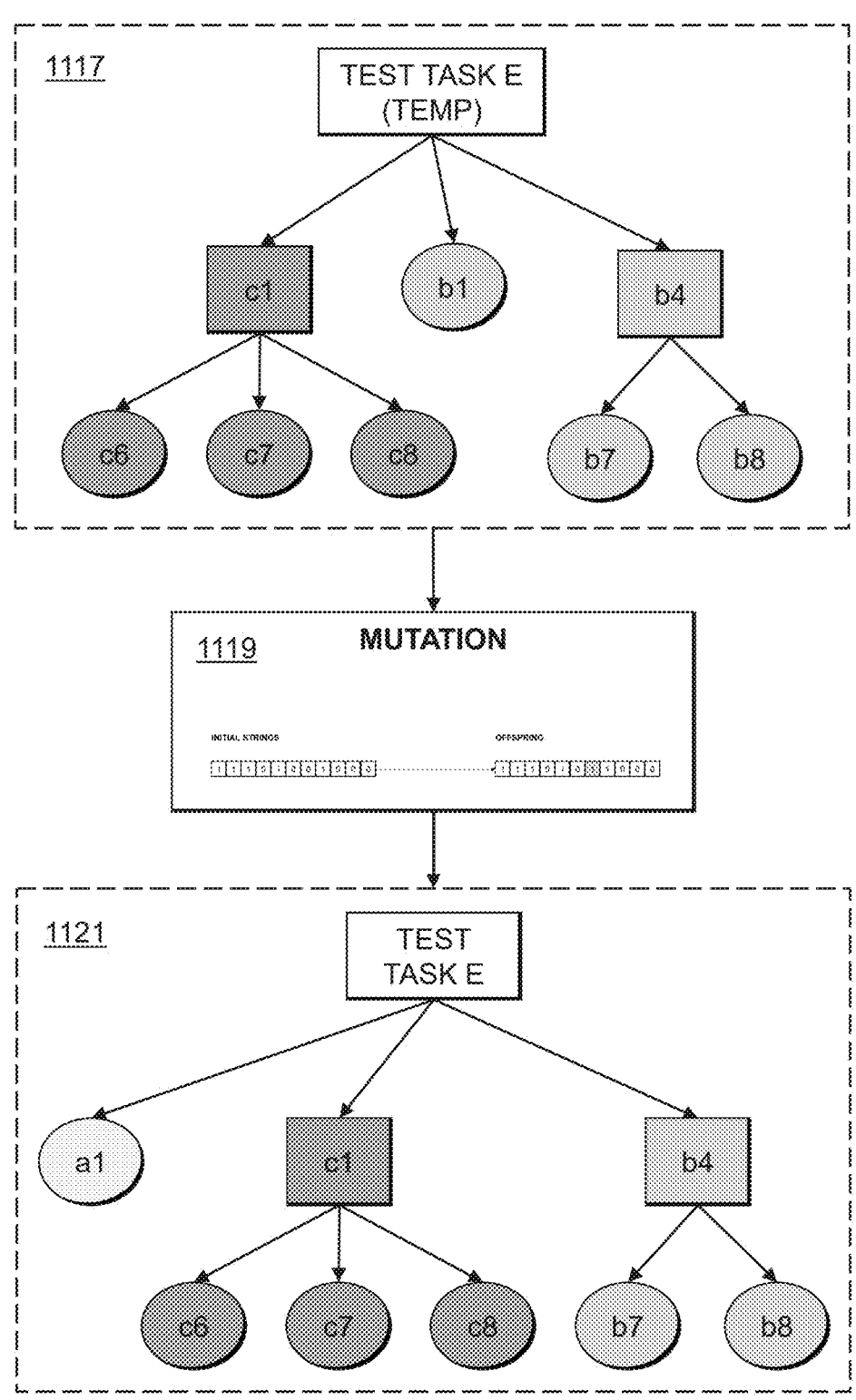

FIG. 11C shows application of mutation 1111 to the behavior tree 1109 for the temporary test task D to result in a behavior tree 1113 for a new test task D. The behavior tree 1113 for test task D includes action nodes d1, b3, d5, d6, a5 and a6, as well as control flow nodes d2 and a3. FIG. 11D shows application of crossover 1115 to the behavior trees 1103 and 1105 for test tasks B and C, resulting in an intermediate or temporary new test task E with an associated behavior tree 1117. The behavior tree 1117 for temporary test task E includes action nodes b1, c6, c7, c8, b7 and b8, as well as control flow nodes c1 and b4. FIG. 11E shows application of mutation 1119 to the behavior tree 1117 for the temporary test task E to result in a behavior tree 1121 for a new test task E. The behavior tree 1121 for test task E includes action nodes a1, c6, c7, c8, b7 and b8, as well as control flow nodes c1 and b4. As illustrated in FIGS. 11A-11E, the mutable sub-trees and leaves can be recombined and mutated to generate new trees.

Once the offspring are generated by the GA operators 309 to produce a test plan 311, the test plan 311 will be executed 313 and evaluated 315 using the testing goal and fitness function 317. After execution 313 of the test plan 311, the evaluation 315 is performed to generate a score based on the testing goal and fitness function 317. Based on the scores, the testing behaviors are added to the behavior library 303 and made available for selection 307 in a new generation of the GA. The whole system flow 300 and algorithm 350 may be repeated as desired (e.g., for a designated number of generations or iterations, until testing goals and/or fitness functions 317 are changed, etc.). In the behavior library 303, the test behaviors with higher scores have a higher probability to be selected 307 for the next round of testing, while the test behaviors with lower scores may be eliminated if desired after some designated threshold number of iterations. The system flow 300 and algorithm 350 shown in FIGS. 3A and 3B can thus be used for generating a large number of test behaviors with good scores for multiple testing goals.

FIG. 12 shows a robot operating system (ROS) 1200, which implements an open-source robotic middleware suite to support communication of distributed nodes at runtime for implementation of a testing plan design system (e.g., 110), including one or more planner ROS nodes 1201, one or more actuator ROS nodes 1203, one or more sensor ROS nodes 1205, and one or more evaluator ROS nodes 1207. The planner ROS nodes 1201 are configured to initialize a behavior library (e.g., 303) from a persistent database (e.g., 108), for selecting (e.g., 307) individual test plans and for delivering the selected test plans to the actuator ROS nodes 1203. The planner ROS nodes 1201 can further generate new test plans (e.g., 311) based on GA operators (e.g., 309), and for persisting the evaluated (e.g., 315) test plans to the behavior library.

The actuator ROS nodes 1203 are configured for executing (e.g., 313) the generated test plans (e.g., 311), which may be represented by behavior trees. The actuator ROS nodes 1203 may subscribe to messages from other nodes in the ROS 1200, such as the planner ROS nodes 1201 (e.g., for receiving new test plans), the sensor ROS nodes 1205 (e.g., to understand internal state of the computing device being tested), etc.

The sensor ROS nodes 1205 are configured to collect system metrics and internal states from computing devices (e.g., 301) or other IT assets (e.g., 106) being tested, and for publishing the system state information to other subscriber nodes in the ROS 1200, such as the actuator ROS nodes 1203 and the evaluator ROS nodes 1207.

The evaluator ROS nodes 1207 may be viewed as a kind of high-level sensor, which each may subscribe to relevant ones of the sensor ROS nodes 1205 and evaluates (e.g., 315) test plans that are executed by the actuator ROS nodes 1203 in accordance with testing goals and predefined fitness functions (e.g., 317) based on the data received from the sensor ROS nodes 1205. The evaluation results may be published to other subscriber nodes in the ROS 1200, such as the planner ROS nodes 1201, the actuator ROS nodes 1203, higher-level ones of the evaluator ROS nodes 1207, etc.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for machine learning-based generation of testing plans for testing of IT assets will now be described in greater detail with reference to FIGS. 13 and 14. Although described in the context of information processing system 100, these platforms may also be used to implement at least portions of other information processing systems in other embodiments.

Figure 13:
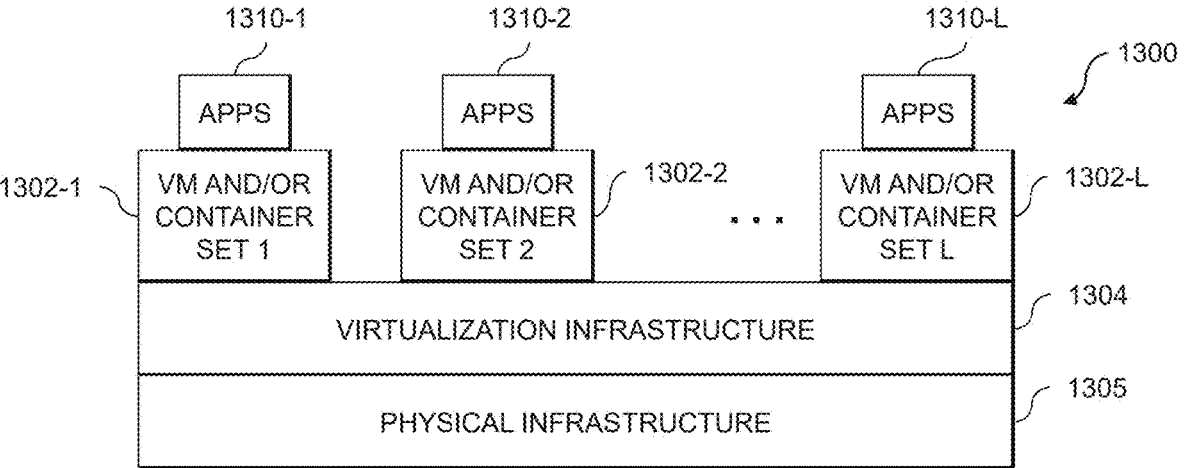
FIGS. 13 and 14 show examples of processing platforms that may be utilized to implement at least a portion of an information processing system in illustrative embodiments.
Figure 14:
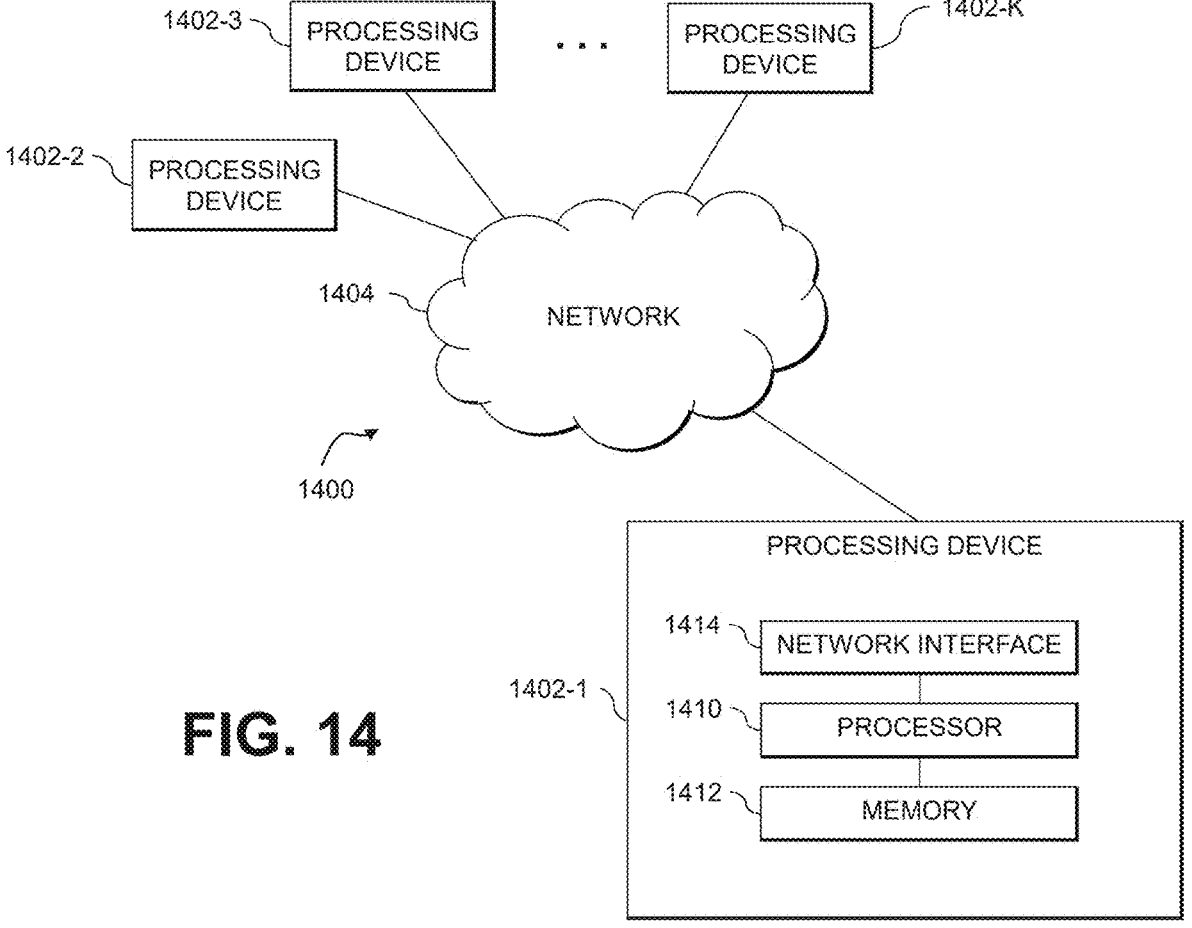

FIG. 13 shows an example processing platform comprising cloud infrastructure 1300. The cloud infrastructure 1300 comprises a combination of physical and virtual processing resources that may be utilized to implement at least a portion of the information processing system 100 in FIG. 1. The cloud infrastructure 1300 comprises multiple virtual machines (VMs) and/or container sets 1302-1, 1302-2, . . . 1302-L implemented using virtualization infrastructure 1304. The virtualization infrastructure 1304 runs on physical infrastructure 1305, and illustratively comprises one or more hypervisors and/or operating system level virtualization infrastructure. The operating system level virtualization infrastructure illustratively comprises kernel control groups of a Linux operating system or other type of operating system.

The cloud infrastructure 1300 further comprises sets of applications 1310-1, 1310-2, . . . 1310-L running on respective ones of the VMs/container sets 1302-1, 1302-2, . . . 1302-L under the control of the virtualization infrastructure 1304. The VMs/container sets 1302 may comprise respective VMs, respective sets of one or more containers, or respective sets of one or more containers running in VMs.

In some implementations of the FIG. 13 embodiment, the VMs/container sets 1302 comprise respective VMs implemented using virtualization infrastructure 1304 that comprises at least one hypervisor. A hypervisor platform may be used to implement a hypervisor within the virtualization infrastructure 1304, where the hypervisor platform has an associated virtual infrastructure management system. The underlying physical machines may comprise one or more distributed processing platforms that include one or more storage systems.

In other implementations of the FIG. 13 embodiment, the VMs/container sets 1302 comprise respective containers implemented using virtualization infrastructure 1304 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of information processing system 100 may each run on a computer, server, storage device or other processing platform element. A given such element may be viewed as an example of what is more generally referred to herein as a "processing device." The cloud infrastructure 1300 shown in FIG. 13 may represent at least a portion of one processing platform. Another example of such a processing platform is processing platform 1400 shown in FIG. 14.

The processing platform 1400 in this embodiment comprises a portion of information processing system 100 and includes a plurality of processing devices, denoted 1402-1, 1402-2, 1402-3, . . . 1402-K, which communicate with one another over a network 1404.

The network 1404 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1402-1 in the processing platform 1400 comprises a processor 1410 coupled to a memory 1412.

The processor 1410 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1412 may comprise random access memory (RAM), read-only memory (ROM), flash memory or other types of memory, in any combination. The memory 1412 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1402-1 is network interface circuitry 1414, which is used to interface the processing device with the network 1404 and other system components, and may comprise conventional transceivers.

The other processing devices 1402 of the processing platform 1400 are assumed to be configured in a manner similar to that shown for processing device 1402-1 in the figure.

Again, the particular processing platform 1400 shown in the figure is presented by way of example only, and information processing system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for machine learning-based generation of testing plans for testing of IT assets as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, testing plans, testing tasks testing actions, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
   determining one or more testing goals for testing to be performed on one or more of a plurality of information technology assets of an information technology infrastructure;
   selecting two or more testing plans of a plurality of testing plans based at least in part on scores assigned to respective ones of the plurality of testing plans, the assigned scores characterizing whether respective ones of the plurality of testing plans meet the determined one or more testing goals, the selected two or more testing plans comprising a first testing plan comprising a first behavior tree and a second testing plan comprising a second behavior tree, the first behavior tree comprising a first plurality of nodes representing a first set of one or more testing tasks, the second behavior tree comprising a second plurality of nodes representing a second set of one or more testing tasks;
   generating, utilizing one or more machine learning-based genetic algorithms that take as input the selected two or more testing plans, one or more additional testing plans, wherein the one or more machine learning-based genetic algorithms implement at least one genetic algorithm operator configured to generate a given one of the one or more additional testing plans through combining a first subset of the first plurality of nodes of the first behavior tree and a second subset of the second plurality of nodes of the second behavior tree; and
   executing the one or more additional testing plans on the one or more of the plurality of information technology assets of the information technology infrastructure;

wherein the method is performed by at least one processing device comprising a processor coupled to a memory.

2. The method of claim 1 wherein the at least one genetic algorithm operator of the one or more machine learning-based genetic algorithms comprises:
   a crossover operation to generate a given one of the one or more additional testing plans; and
   a mutation operation applied to a given one of the selected two or more testing plans to generate the given one of the one or more additional testing plans.

3. The method of claim 1 wherein the first plurality of nodes of the first behavior tree comprises one or more execution nodes representing one or more test actions and one or more control flow nodes connecting two or more of the first plurality of nodes.

4. The method of claim 1 wherein the testing to be performed on the one or more of the plurality of information technology assets of the information technology infrastructure comprises testing of a write cache of a storage system, and wherein a given one of the one or more testing goals comprises determining a balance among two or more states of the write cache of the storage system over a designated period of time.

5. The method of claim 1 wherein the testing to be performed on the one or more of the plurality of information technology assets of the information technology infrastructure comprises testing of a write cache of a storage system, and wherein a given one of the one or more testing goals comprises determining at least one of an order and a timing of traversal of two or more states of the write cache of the storage system over a designated period of time.

6. A computer program product comprising a non-transitory processor-readable storage medium having stored therein program code of one or more software programs, wherein the program code when executed by at least one processing device causes the at least one processing device to perform steps of:
   determining one or more testing goals for testing to be performed on one or more of a plurality of information technology assets of an information technology infrastructure;
   selecting two or more testing plans of a plurality of testing plans based at least in part on scores assigned to respective ones of the plurality of testing plans, the assigned scores characterizing whether respective ones of the plurality of testing plans meet the determined one or more testing goals, the selected two or more testing plans comprising a first testing plan comprising a first behavior tree and a second testing plan comprising a second behavior tree, the first behavior tree comprising a first plurality of nodes representing a first set of one or more testing tasks, the second behavior tree comprising a second plurality of nodes representing a second set of one or more testing tasks;
   generating, utilizing one or more machine learning-based genetic algorithms that take as input the selected two or more testing plans, one or more additional testing plans, wherein the one or more machine learning-based genetic algorithms implement at least one genetic algorithm operator configured to generate a given one of the one or more additional testing plans through combining a first subset of the first plurality of nodes of the first behavior tree and a second subset of the second plurality of nodes of the second behavior tree; and executing the one or more additional testing plans on the one or more of the plurality of information technology assets of the information technology infrastructure.

7. The computer program product of claim 6 wherein the at least one genetic algorithm operator of the one or more machine learning-based genetic algorithms comprises:

a crossover operation to generate a given one of the one or more additional testing plans; and a mutation operation applied to a given one of the selected two or more testing plans to generate the given one of the one or more additional testing plans.

8. The computer program product of claim 6 wherein the first plurality of nodes of the first behavior tree comprises one or more execution nodes representing one or more test actions and one or more control flow nodes connecting two or more of the first plurality of nodes.

9. An apparatus comprising:

at least one processing device comprising a processor coupled to a memory;

the at least one processing device being configured to perform steps of:

determining one or more testing goals for testing to be performed on one or more of a plurality of information technology assets of an information technology infrastructure;

selecting two or more testing plans of a plurality of testing plans based at least in part on scores assigned to respective ones of the plurality of testing plans, the assigned scores characterizing whether respective ones of the plurality of testing plans meet the determined one or more testing goals, the selected two or more testing plans comprising a first testing plan comprising a first behavior tree and a second testing plan comprising a second behavior tree, the first behavior tree comprising a first plurality of nodes representing a first set of one or more testing tasks, the second behavior tree comprising a second plurality of nodes representing a second set of one or more testing tasks;

generating, utilizing one or more machine learning-based genetic algorithms that take as input the selected two or more testing plans, one or more additional testing plans, wherein the one or more machine learning-based genetic algorithms implement at least one genetic algorithm operator configured to generate a given one of the one or more additional testing plans through combining a first subset of the first plurality of nodes of the first behavior tree and a second subset of the second plurality of nodes of the second behavior tree; and executing the one or more additional testing plans on the one or more of the plurality of information technology assets of the information technology infrastructure.

10. The apparatus of claim 9 wherein the at least one processing device is further configured to perform the steps of:

evaluating, based at least in part on execution results of the one or more additional testing plans on the one or more of the plurality of information technology assets of the information technology infrastructure, whether the one or more additional testing plans meet the determined one or more testing goals; and assigning scores to the one or more additional testing plans based at least in part on the evaluation.

11. The apparatus of claim 10 wherein the at least one processing device is further configured to perform the steps of:

modifying the plurality of testing plans by adding ones of the one or more additional testing plans having assigned scores exceeding a designated threshold; and performing one or more subsequent iterations of the selecting, generating, executing and evaluating steps utilizing the modified plurality of testing plans.

12. The apparatus of claim 10 wherein the at least one processing device is further configured to perform the steps of:

modifying the plurality of testing plans by removing one or more of the testing plans having assigned scores below a designated threshold; and performing one or more subsequent iterations of the selecting, generating, executing and evaluating steps utilizing the modified plurality of testing plans.

13. The apparatus of claim 9 wherein the at least one genetic algorithm operator of the one or more machine learning-based genetic algorithms comprises a crossover operation.

14. The apparatus of claim 9 wherein generating the given one of the one or more additional testing plans further comprises applying a mutation operation to at least one of (i) one or more of the first plurality of nodes of the first behavior tree and (ii) one or more of the second plurality of nodes of the second behavior tree.

15. The apparatus of claim 9 wherein the at least one genetic algorithm operator of the one or more machine learning-based genetic algorithms comprises a sequence of two or more genetic algorithm operators comprising:

at least one crossover operation applied to first and second ones of the selected two or more testing plans to generate an intermediate testing plan; and at least one mutation operation applied to the intermediate testing plan to generate the given one of the one or more additional testing plans.

16. The apparatus of claim 9 wherein the at least one genetic algorithm operator of the one or more machine learning-based genetic algorithms comprises a sequence of two or more genetic algorithm operators comprising:

at least one mutation operation applied to a first one of the selected two or more testing plans to generate an intermediate testing plan; and at least one crossover operation applied to the intermediate testing plan and a second one of the selected two or more testing plans to generate the given one of the one or more additional testing plans.

17. The apparatus of claim 9, wherein the first plurality of nodes of the first behavior tree comprises one or more execution nodes representing one or more test actions and one or more control flow nodes connecting two or more of the first plurality of nodes.

18. The apparatus of claim 9 wherein the first testing plan comprises a set of two or more testing task behavior sub-trees, each of the set of two or more testing task behavior sub-trees comprising at least one execution node representing at least one test action.

19. The apparatus of claim 9 wherein the testing to be performed on the one or more of the plurality of information technology assets of the information technology infrastructure comprises testing of a write cache of a storage system, and wherein a given one of the one or more testing goals comprises determining a balance among two or more states of the write cache of the storage system over a designated period of time.

20. The apparatus of claim 9 wherein the testing to be performed on the one or more of the plurality of information technology assets of the information technology infrastructure comprises testing of a write cache of a storage system, and wherein a given one of the one or more testing goals comprises determining at least one of an order and a timing of traversal of two or more states of the write cache of the storage system over a designated period of time.

* * * * *